(12) United States Patent
Lu et al.

(10) Patent No.: US 9,538,137 B2
(45) Date of Patent: Jan. 3, 2017

(54) MITIGATING LOSS IN INTER-OPERABILITY SCENARIOS FOR DIGITAL VIDEO

(71) Applicant: Microsoft Technology Licensing, LLC, Redmond, WA (US)

(72) Inventors: Mei-Hsuan Lu, Bellevue, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/683,118

(22) Filed: Apr. 9, 2015

(65) Prior Publication Data

US 2016/0301895 A1 Oct. 13, 2016

(51) Int. Cl.
*H04N 7/15* (2006.01)
*H04N 19/103* (2014.01)
(Continued)

(52) U.S. Cl.
CPC .............. *H04N 7/15* (2013.01); *H04N 19/103* (2014.11); *H04N 19/154* (2014.11); *H04N 19/184* (2014.11); *H04N 19/65* (2014.11)

(58) Field of Classification Search
USPC ....................................... 348/14.08
See application file for complete search history.

(56) References Cited

U.S. PATENT DOCUMENTS 5,625,410 A 4/1997 Washino et al.
8,311,106 B2 11/2012 Ahn et al.
(Continued)

FOREIGN PATENT DOCUMENTS

CN 101547369 2/2013
EP 2560386 2/2013
(Continued)

OTHER PUBLICATIONS

Morford, "BitMaT—Bitstream Manipulation Tool for Xilinx FPGAs," Thesis, Bradley Department of Electrical and Computer Engineering, 71 pp. (Dec. 2005).
(Continued)

*Primary Examiner* — Creighton Smith
(74) *Attorney, Agent, or Firm* — Tom Wong; Micky Minhas

(57) ABSTRACT

Ways to mitigate loss in inter-operability scenarios for digital video are presented. For example, a bitstream modification tool (such as a bitstream rewriter running on a network node of a videoconferencing system) receives an incoming bitstream of encoded video (e.g., from an encoder that uses a first loss recovery strategy). The bitstream modification tool processes the incoming bitstream of encoded video to produce an outgoing bitstream of encoded video. In doing so, the bitstream modification tool changes at least one syntax element between the incoming bitstream and the outgoing bitstream so as to mitigate picture loss effects during decoding of the outgoing bitstream under lossy delivery conditions. The bitstream modification tool outputs the outgoing bitstream. In this way, the bitstream modification tool can help avoid blank screens, frozen screens, or other failures during decoding under lossy delivery conditions (e.g., with a decoder that uses a different loss recovery strategy).

30 Claims, 14 Drawing Sheets

(51) Int. Cl.
*H04N 19/184* (2014.01)
*H04N 19/154* (2014.01)
*H04N 19/65* (2014.01)

(56) References Cited

U.S. PATENT DOCUMENTS

| | | |
|---|---|---|
| 8,855,197 B2 | 10/2014 | Fisher et al. |
| 9,204,156 B2 | 12/2015 | Lu et al. |
| 2006/0013318 A1 | 1/2006 | Webb et al. |
| 2006/0146734 A1* | 7/2006 | Wenger ............ H04L 29/06027 370/260 |
| 2006/0233247 A1 | 10/2006 | Visharam et al. |
| 2007/0183494 A1* | 8/2007 | Hannuksela ... H04N 21/234327 375/240.1 |
| 2007/0206673 A1 | 9/2007 | Cipolli et al. |
| 2007/0223575 A1 | 9/2007 | Wang et al. |
| 2007/0230568 A1 | 10/2007 | Eleftheriadis et al. |
| 2008/0007438 A1 | 1/2008 | Segall et al. |
| 2008/0175325 A1 | 7/2008 | Hannuksela et al. |
| 2009/0003431 A1 | 1/2009 | Zhu et al. |
| 2009/0116546 A1 | 5/2009 | Park et al. |
| 2009/0219989 A1 | 9/2009 | Tanaka et al. |
| 2010/0091837 A1 | 4/2010 | Zhu et al. |
| 2010/0208825 A1 | 8/2010 | Chou et al. |
| 2011/0216828 A1 | 9/2011 | Yang |
| 2012/0057635 A1 | 3/2012 | Rusert et al. |
| 2012/0082226 A1 | 4/2012 | Weber |
| 2012/0201310 A1 | 8/2012 | Yamagishi et al. |
| 2012/0210447 A1 | 8/2012 | Vazquez et al. |
| 2013/0114718 A1 | 5/2013 | Lu et al. |
| 2013/0332974 A1 | 12/2013 | Lundqvist et al. |
| 2014/0086326 A1 | 3/2014 | Dziecielewski |

FOREIGN PATENT DOCUMENTS

| | | |
|---|---|---|
| EP | 2571278 | 3/2013 |
| WO | WO 2012/003237 | 3/2013 |

OTHER PUBLICATIONS

"Understanding the Lync Video Interoperability Server (VIS)," downloaded from the World Wide Web, 5 pp. (Mar. 2014).

Vetro et al., "Overview of the Stereo and Multiview Video Coding Extensions of the H.264/MPEG-4 AVC Standard," *IEEE*, vol. 99, No. 4, 16 pp. (Jan. 2011).

Cock et al., "Advanced Bitstream Rewriting from H.264/AVC to SVC," *ICIP* (2008).

Dziri et al., "P-Picture based H.264 AVC to H.264 SVC Temporal Transcoding," *IEEE*, pp. 425-430 (2008).

Schafer et al., "MCTF and Scalability Extension of H.264/AVC and its Application to Video Transmission, Storage, and Surveillance," *Proc. SPIE*, vol. 5960, 12 pp. (2005).

ITU-T, "Advanced Video Coding for Generic Audiovisual Services," ITU-T H.264, 676 pp. (Mar. 2010).

International Search Report and Written Opinion dated Aug. 19, 2016, from International Patent Application No. PCT/US2016/026281, 20 pp.

Sjoberg et al., "Overview of the HEVC High-Level Syntax and Reference Picture Management," *IEEE Trans. on Circuits and Systems for Video Technology*, vol. 22, No. 2, pp. 1858-1870 (Dec. 2012).

Wu et al., "An Error Concealment Scheme for Entire Frame Losses Based on H.264/AVC," *IEEE Int'l Symp. on Circuits and Systems*, pp. 4463-4466 (May 2006).

* cited by examiner software 180 implementing one or more innovations for bitstream modification to mitigate loss in inter-operability scenarios for digital video

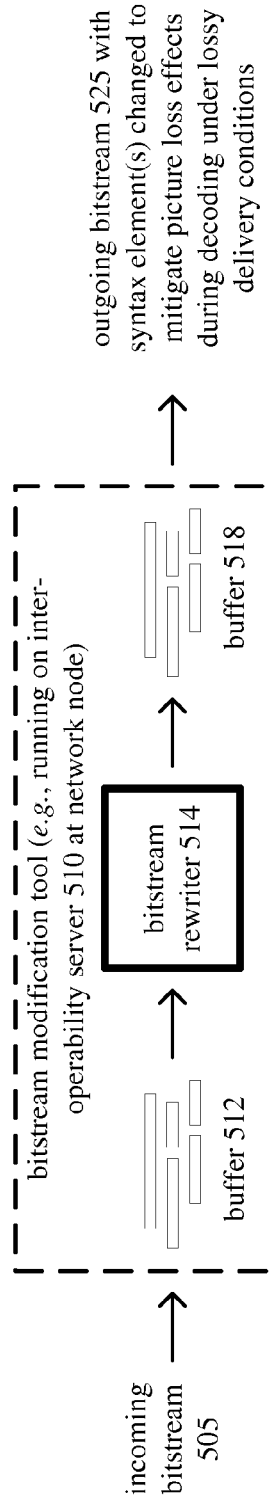
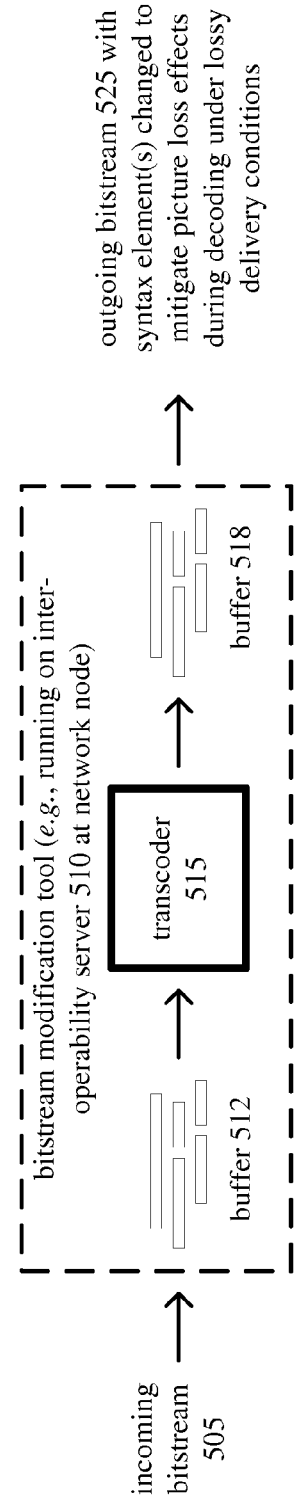

FIG. 8  800   syntax elements (801, 802) potentially changed
between incoming and outgoing bitstreams to
mitigate loss in inter-operability scenarios

| nal_unit( NumBytesInNALunit ) { | C | Descriptor |
|---|---|---|
| forbidden_zero_bit | All | f(1) |
| 801  nal_ref_idc | All | u(2) |
| 802  nal_unit_type | All | u(5) |
| NumBytesInRBSP = 0 | | |
| nalUnitHeaderBytes = 1 | | |
| if( nal_unit_type == 14 || nal_unit_type == 20 ) { | | |
|   svc_extension_flag | All | u(1) |
|   if( svc_extension_flag ) | | |
|     nal_unit_header_svc_extension( ) /* specified in Annex G */ | All | |
|   else | | |
|     nal_unit_header_mvc_extension( ) /* specified in Annex H */ | All | |
|   nalUnitHeaderBytes += 3 | | |
| } | | |
| for( i = nalUnitHeaderBytes; i < NumBytesInNALunit; i++ ) { | | |
|   if( i + 2 < NumBytesInNALunit && next_bits( 24 ) == 0x000003 ) { | | |
|     rbsp_byte[ NumBytesInRBSP++ ] | All | b(8) |
|     rbsp_byte[ NumBytesInRBSP++ ] | All | b(8) |
|     i += 2 | | |
|     emulation_prevention_three_byte /* equal to 0x03 */ | All | f(8) |
|   } else | | |
|     rbsp_byte[ NumBytesInRBSP++ ] | All | b(8) |
|   } | | |
| } | | |

FIG. 9a    900 syntax element (901) potentially changed between incoming and outgoing bitstreams to mitigate loss in inter-operability scenarios

| seq_parameter_set_data( ) { | C | Descriptor |
|---|---|---|
|   profile_idc | 0 | u(8) |
|   constraint_set0_flag | 0 | u(1) |
|   constraint_set1_flag | 0 | u(1) |
|   constraint_set2_flag | 0 | u(1) |
|   constraint_set3_flag | 0 | u(1) |
|   constraint_set4_flag | 0 | u(1) |
|   constraint_set5_flag | 0 | u(1) |
|   reserved_zero_2bits /* equal to 0 */ | 0 | u(2) |
|   level_idc | 0 | u(8) |
|   seq_parameter_set_id | 0 | ue(v) |
|   if( profile_idc == 100 \|\| profile_idc == 110 \|\|<br>    profile_idc == 122 \|\| profile_idc == 244 \|\| profile_idc == 44 \|\|<br>    profile_idc == 83 \|\| profile_idc == 86 \|\| profile_idc == 118 \|\|<br>    profile_idc == 128 ) { | | |
|     chroma_format_idc | 0 | ue(v) |
|     if( chroma_format_idc == 3 ) | | |
|       separate_colour_plane_flag | 0 | u(1) |
|     bit_depth_luma_minus8 | 0 | ue(v) |
|     bit_depth_chroma_minus8 | 0 | ue(v) |
|     qpprime_y_zero_transform_bypass_flag | 0 | u(1) |
|     seq_scaling_matrix_present_flag | 0 | u(1) |
|     if( seq_scaling_matrix_present_flag ) | | |
|       for( i = 0; i < ( ( chroma_format_idc != 3 ) ? 8 : 12 ); i++ ) { | | |
|         seq_scaling_list_present_flag[ i ] | 0 | u(1) |
|         if( seq_scaling_list_present_flag[ i ] ) | | |
|           if( i < 6 ) | | |
|             scaling_list( ScalingList4x4[ i ], 16,<br>                UseDefaultScalingMatrix4x4Flag[ i ] ) | 0 | |
|           else | | |
|             scaling_list( ScalingList8x8[ i − 6 ], 64,<br>                UseDefaultScalingMatrix8x8Flag[ i − 6 ] ) | 0 | |
|       } | | |
|   } | | |
|   log2_max_frame_num_minus4 | 0 | ue(v) |
|   pic_order_cnt_type | 0 | ue(v) |
|   if( pic_order_cnt_type == 0 ) | | |
|     log2_max_pic_order_cnt_lsb_minus4 | 0 | ue(v) | continued in FIG. 9b

FIG. 9b    900    continued from FIG. 9a

| | | |
|---|---|---|
| else if( pic_order_cnt_type == 1 ) { | | |
|    delta_pic_order_always_zero_flag | 0 | u(1) |
|    offset_for_non_ref_pic | 0 | se(v) |
|    offset_for_top_to_bottom_field | 0 | se(v) |
|    num_ref_frames_in_pic_order_cnt_cycle | 0 | ue(v) |
|    for( i = 0; i < num_ref_frames_in_pic_order_cnt_cycle; i++ ) | | |
|       offset_for_ref_frame[ i ] | 0 | se(v) |
| } | | |
| max_num_ref_frames    *(901)* | 0 | ue(v) |
| gaps_in_frame_num_value_allowed_flag | 0 | u(1) |
| pic_width_in_mbs_minus1 | 0 | ue(v) |
| pic_height_in_map_units_minus1 | 0 | ue(v) |
| frame_mbs_only_flag | 0 | u(1) |
| if( !frame_mbs_only_flag ) | | |
|    mb_adaptive_frame_field_flag | 0 | u(1) |
| direct_8x8_inference_flag | 0 | u(1) |
| frame_cropping_flag | 0 | u(1) |
| if( frame_cropping_flag ) { | | |
|    frame_crop_left_offset | 0 | ue(v) |
|    frame_crop_right_offset | 0 | ue(v) |
|    frame_crop_top_offset | 0 | ue(v) |
|    frame_crop_bottom_offset | 0 | ue(v) |
| } | | |
| vui_parameters_present_flag | 0 | u(1) |
| if( vui_parameters_present_flag ) | | |
|    vui_parameters( ) | 0 | |
| } | | |

FIG. 10a 1000 syntax elements (1001, 1002) and structures (1100, 1200) potentially changed between incoming and outgoing bitstreams to mitigate loss in inter-operability scenarios

| slice_header( ) { | C | Descriptor |
|---|---|---|
|   first_mb_in_slice | 2 | ue(v) |
|   slice_type | 2 | ue(v) |
|   pic_parameter_set_id | 2 | ue(v) |
|   if( separate_colour_plane_flag == 1 ) | | |
|     colour_plane_id | 2 | u(2) |
|   frame_num | 2 | u(v) |
|   if( !frame_mbs_only_flag ) { | | |
|     field_pic_flag | 2 | u(1) |
|     if( field_pic_flag ) | | |
|       bottom_field_flag | 2 | u(1) |
|   } | | |
|   if( IdrPicFlag ) | | |
|     idr_pic_id | 2 | ue(v) |
|   if( pic_order_cnt_type == 0 ) { | | |
|     pic_order_cnt_lsb | 2 | u(v) |
|     if( bottom_field_pic_order_in_frame_present_flag && !field_pic_flag ) | | |
|       delta_pic_order_cnt_bottom | 2 | se(v) |
|   } | | |
|   if( pic_order_cnt_type == 1 && !delta_pic_order_always_zero_flag ) { | | |
|     delta_pic_order_cnt[ 0 ] | 2 | se(v) |
|     if( bottom_field_pic_order_in_frame_present_flag && !field_pic_flag ) | | |
|       delta_pic_order_cnt[ 1 ] | 2 | se(v) |

1001 → frame_num
1002 → idr_pic_id continued in FIG. 10b

FIG. 10b  1000    continued from FIG. 10a

| | | |
|---|---|---|
| } | | |
| if( redundant_pic_cnt_present_flag ) | | |
|     redundant_pic_cnt | 2 | ue(v) |
| if( slice_type == B ) | | |
|     direct_spatial_mv_pred_flag | 2 | u(1) |
| if( slice_type == P \|\| slice_type == SP \|\| slice_type == B ) { | | |
|     num_ref_idx_active_override_flag | 2 | u(1) |
|     if( num_ref_idx_active_override_flag ) { | | |
|         num_ref_idx_l0_active_minus1 | 2 | ue(v) |
|         if( slice_type == B ) | | |
|             num_ref_idx_l1_active_minus1 | 2 | ue(v) |
|     } | | |
| } | | |
| if( nal_unit_type == 20 ) | | |
|     ref_pic_list_mvc_modification( ) /* specified in Annex H */ | 2 | |
| else | | |
|     ref_pic_list_modification( )   ← 1100 | 2 | |
| if( ( weighted_pred_flag && ( slice_type == P \|\| slice_type == SP ) ) \|\| <br>  ( weighted_bipred_idc == 1 && slice_type == B ) ) | | |
|     pred_weight_table( ) | 2 | |
| if( nal_ref_idc != 0 ) | | |
|     dec_ref_pic_marking( )   ← 1200 | 2 | |
| if( entropy_coding_mode_flag && slice_type != I && slice_type != SI ) | | |
|     cabac_init_idc | 2 | ue(v) |
| slice_qp_delta | 2 | se(v) |
| if( slice_type == SP \|\| slice_type == SI ) { | | |
|     if( slice_type == SP ) | | |
|         sp_for_switch_flag | 2 | u(1) |
|     slice_qs_delta | 2 | se(v) |
| } | | |
| if( deblocking_filter_control_present_flag ) { | | |
|     disable_deblocking_filter_idc | 2 | ue(v) |
|     if( disable_deblocking_filter_idc != 1 ) { | | |
|         slice_alpha_c0_offset_div2 | 2 | se(v) |
|         slice_beta_offset_div2 | 2 | se(v) |
|     } | | |
| } | | |
| if( num_slice_groups_minus1 > 0 && <br>  slice_group_map_type >= 3 && slice_group_map_type <= 5 ) | | |
|     slice_group_change_cycle | 2 | u(v) |
| } | | |

FIG. 11  1100 — syntax elements (1101, 1102, 1103) potentially changed between incoming and outgoing bitstreams to mitigate loss in inter-operability scenarios

| | C | Descriptor |
|---|---|---|
| ref_pic_list_modification( ) { | | |
|   if( slice_type % 5 != 2 && slice_type % 5 != 4 ) { | | |
|     ref_pic_list_modification_flag_l0 | 2 | u(1) |
|     if( ref_pic_list_modification_flag_l0 ) | | |
|       do { | | |
|         modification_of_pic_nums_idc  ← 1101 | 2 | ue(v) |
|         if( modification_of_pic_nums_idc == 0 \|\| | | |
|           modification_of_pic_nums_idc == 1 ) | | |
|           abs_diff_pic_num_minus1  ← 1102 | 2 | ue(v) |
|         else if( modification_of_pic_nums_idc == 2 ) | | |
|           long_term_pic_num  ← 1103 | 2 | ue(v) |
|       } while( modification_of_pic_nums_idc != 3 ) | | |
|   } | | |
|   if( slice_type % 5 == 1 ) { | | |
|     ref_pic_list_modification_flag_l1 | 2 | u(1) |
|     if( ref_pic_list_modification_flag_l1 ) | | |
|       do { | | |
|         modification_of_pic_nums_idc | 2 | ue(v) |
|         if( modification_of_pic_nums_idc == 0 \|\| | | |
|           modification_of_pic_nums_idc == 1 ) | | |
|           abs_diff_pic_num_minus1 | 2 | ue(v) |
|         else if( modification_of_pic_nums_idc == 2 ) | | |
|           long_term_pic_num | 2 | ue(v) |
|       } while( modification_of_pic_nums_idc != 3 ) | | |
|   } | | |
| } | | |

FIG. 12  1200 syntax elements (1201, 1202) potentially changed between incoming and outgoing bitstreams to mitigate loss in inter-operability scenarios

| dec_ref_pic_marking( ) { | C | Descriptor |
|---|---|---|
| if( IdrPicFlag ) { | | |
|    no_output_of_prior_pics_flag | 2 \| 5 | u(1) |
|    long_term_reference_flag | 2 \| 5 | u(1) |
| } else { | | |
|    adaptive_ref_pic_marking_mode_flag | 2 \| 5 | u(1) |
|    if( adaptive_ref_pic_marking_mode_flag ) | | |
|      do { | | |
|         memory_management_control_operation | 2 \| 5 | ue(v) |
|         if( memory_management_control_operation == 1 \|\| <br>           memory_management_control_operation == 3 ) | | |
|            difference_of_pic_nums_minus1 | 2 \| 5 | ue(v) |
|         if(memory_management_control_operation == 2 ) | | |
|            long_term_pic_num | 2 \| 5 | ue(v) |
|         if( memory_management_control_operation == 3 \|\| <br>           memory_management_control_operation == 6 ) | | |
|            long_term_frame_idx | 2 \| 5 | ue(v) |
|         if( memory_management_control_operation == 4 ) | | |
|            max_long_term_frame_idx_plus1 | 2 \| 5 | ue(v) |
|      } while( memory_management_control_operation != 0 ) | | |
|    } | | |
| } | | |

1201 → long_term_reference_flag
1202 → adaptive_ref_pic_marking_mode_flag

MITIGATING LOSS IN INTER-OPERABILITY SCENARIOS FOR DIGITAL VIDEO

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video coding standards have been adopted, including the ITU-T H.261, H.262 (MPEG-2 or ISO/IEC 13818-2), H.263, H.264 (MPEG-4 AVC or ISO/IEC 14496-10), and H.265 (HEVC or ISO/IEC 23008-2) standards, the MPEG-1 (ISO/IEC 11172-2) and MPEG-4 Visual (ISO/IEC 14496-2) standards, and the SMPTE 421M standard. A video codec standard typically defines options for the syntax of an encoded video bitstream, detailing parameters in the bitstream when particular features are used in encoding and decoding. In many cases, a video codec standard also provides details about decoding operations a decoder should perform to achieve conformant results in decoding. Aside from codec standards, various proprietary codec formats (such as VP8, VP9 and other VPx formats) define other options for the syntax of an encoded video bitstream and corresponding decoding operations. In general, a codec standard or format allows an encoder made by one company to inter-operate with a decoder made by another company. Content encoded by the encoder of the first company can be successfully decoded by the decoder of the second company under normal operating conditions, so long as both companies have followed the relevant guidelines in the codec standard or format.

Some operations of a decoder are outside a codec standard or format, however. Such operations can vary depending on implementation, which means different decoders can implement the operations in different ways. In particular, different decoders may use different strategies to recover from the loss of encoded data (e.g., due to network congestion) during decoding. As a result of these differences in implementation, an encoder that uses one loss recovery strategy may encounter unexpected problems when inter-operating with a decoder that uses another loss recovery strategy. For example, during videoconferencing, content encoded with an encoder that uses one loss recovery strategy may be delivered to a decoder that uses the same loss recovery strategy and/or to a decoder that uses another loss recovery strategy. When encoded data is lost due to network congestion, the decoder that uses the same loss recovery strategy may quickly recover from the loss of encoded data, while the decoder that uses the other loss recovery strategy shows a blank screen or frozen screen for several seconds, or even fails to recover, requiring a time-consuming restart of the decoder.

SUMMARY

In summary, the detailed description presents ways to mitigate loss in inter-operability scenarios for digital video. For example, a bitstream rewriter at a network node of a videoconferencing system performs a lightweight bitstream rewriting process on a bitstream it receives from a transmitter node, which runs an encoder that uses a loss recovery strategy. The bitstream rewriter modifies the bitstream to make it more resilient to loss of encoded data (e.g., due to network congestion) when decoded at a receiver node, which runs a decoder that uses another loss recovery strategy. The bitstream rewriter can skip the bitstream rewriting process when the bitstream is delivered to a decoder that uses the same loss recovery strategy as the encoder. In this way, the bitstream rewriter can help avoid blank screens, frozen screens, or other failures during decoding under lossy delivery conditions with the decoder that uses the other loss recovery strategy.

According to one aspect of the innovations described herein, a bitstream modification tool (such as a bitstream rewriter running at a node of a videoconferencing system) receives an incoming bitstream of encoded video organized according to a given codec standard or format. The bitstream modification tool processes the incoming bitstream of encoded video to produce an outgoing bitstream of encoded video organized according to the given codec standard or format. In doing so, the bitstream modification tool changes at least one syntax element between the incoming bitstream and the outgoing bitstream so as to mitigate picture loss effects during decoding of the outgoing bitstream under lossy delivery conditions. At the same time, the quality of video content may be unchanged between the incoming bitstream and the outgoing bitstream in terms of temporal resolution, spatial resolution, and signal-to-noise ratio ("SNR") resolution. For example, despite changes to syntax element(s) to mitigate potential picture loss effects, video content in the incoming bitstream and video content in the outgoing bitstream may have the same frame rate, same coded picture dimensions, and same level of distortion or quantization. The bitstream modification tool outputs the outgoing bitstream.

The innovations can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 5a and 5b are diagrams of example bitstream modification tools in conjunction with which some described embodiments can be implemented.

FIGS. 8, 9a, 9b, 10a, 10b, 11, and 12 are syntax tables including syntax elements modified in some example implementations when switching between two modes for handling of IDR pictures or converting from multiple temporal layers to a single temporal layer.

DETAILED DESCRIPTION

Figure 1:
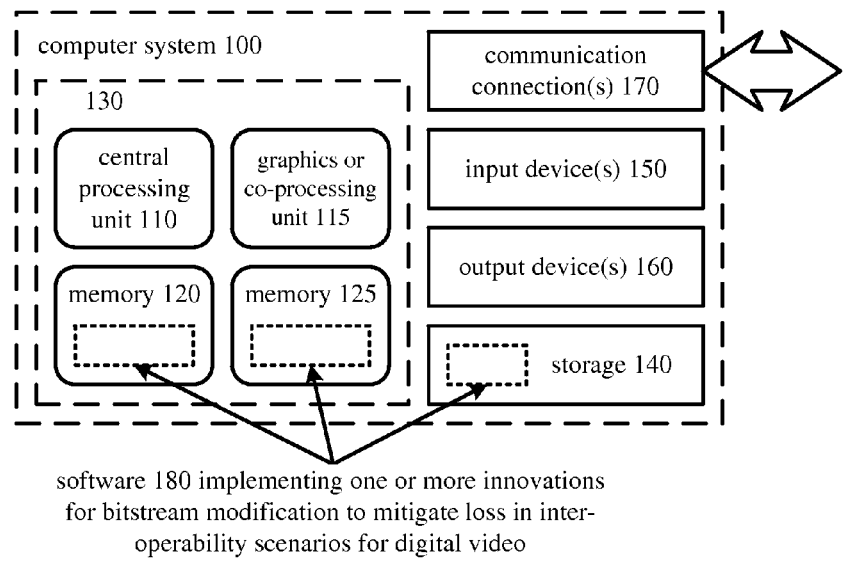
FIG. 1 is a diagram of an example computer system in which some described embodiments can be implemented.

The detailed description presents innovations in mitigating loss in inter-operability scenarios for digital video. For example, in a videoconferencing system with one or more network nodes and multiple end nodes (transmitter nodes, receiver nodes), a bitstream rewriter at a network node performs a lightweight bitstream rewriting process on a bitstream it receives from a transmitter node, which runs an encoder that uses a loss recovery strategy. The bitstream rewriter modifies the bitstream to make it more resilient to loss of encoded data when the bitstream is decoded at a receiver node, which runs a decoder that uses another loss recovery strategy. In this way, the bitstream rewriter can help avoid blank screens, frozen screens, or other failures during decoding under lossy delivery conditions with the decoder that uses the other loss recovery strategy. When the bitstream is delivered to a decoder that uses the same loss recovery strategy as the encoder, the bitstream rewriter can skip the bitstream rewriting process, which permits the decoder to recover normally when decoding under lossy delivery conditions.

In many of the examples presented herein, a bitstream modification tool runs on a network node of a videoconferencing system. Alternatively, the bitstream modification tool can run on an end node of a videoconferencing system, co-sited with an encoder or decoder. Or, the bitstream modification tool is used in another video delivery scenario (e.g., streaming over the Internet for playback through a Web browser or media player, delivery through a broadcast service, satellite service, or cable service).

In many of the examples presented herein, a bitstream modification tool is a bitstream rewriter that performs a lightweight bitstream rewriting process. Alternatively, the bitstream modification tool is a transcoder that fully decodes an incoming bitstream then re-encodes results into the outgoing bitstream, or that partially decodes an incoming bitstream then re-encodes results into the outgoing bitstream (passing through some syntax elements of the incoming bitstream into the outgoing bitstream without modification).

Some of the innovations presented herein are illustrated with reference to syntax elements and operations specific to the H.264 standard. The innovations presented herein can also be implemented for other standards or formats, e.g., the H.265/HEVC standard.

More generally, various alternatives to the examples presented herein are possible. For example, some of the methods presented herein can be altered by changing the ordering of the method acts described, by splitting, repeating, or omitting certain method acts, etc. The various aspects of the disclosed technology can be used in combination or separately. Different embodiments use one or more of the described innovations. Some of the innovations presented herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose CPU, processor in an ASIC or any other type of processor. In a multi-processing system, multiple processing units execute computer-executable instructions to increase processing power. For example, FIG. 1 shows a CPU (110) as well as a GPU or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for bitstream modification to mitigate loss in inter-operability scenarios for video delivery, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic disks, magnetic tapes or cassettes, optical storage media such as CD-ROMs or DVDs, or any other medium which can be used to store information and which can be accessed within the computer system (100). The storage (140) stores instructions for the software (180) implementing one or more innovations for bitstream modification to mitigate loss in inter-operability scenarios for video delivery.

The input device(s) (150) may be a touch input device such as a keyboard, mouse, pen, or trackball, a voice input device, a scanning device, or another device that provides input to the computer system (100). For video, the input device(s) (150) may be a camera, video card, TV tuner card, screen capture module, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above. As used herein, the term "computer-readable media" does not encompass, cover, or otherwise include a carrier wave, propagating signal, or signal per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

For the sake of presentation, the detailed description uses terms like "determine," "set," and "use" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
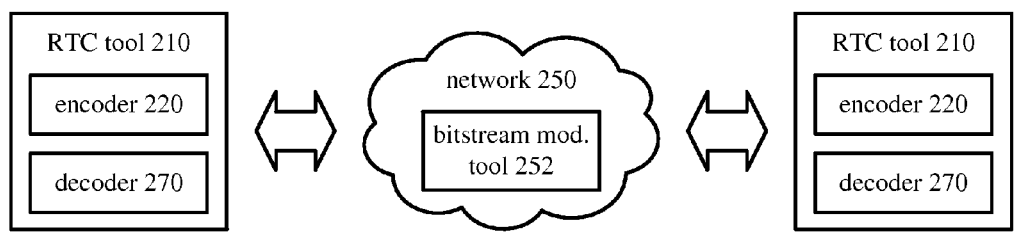
FIGS. 2a and 2b are diagrams of example network environments in which some described embodiments can be implemented.
Figure 2B:
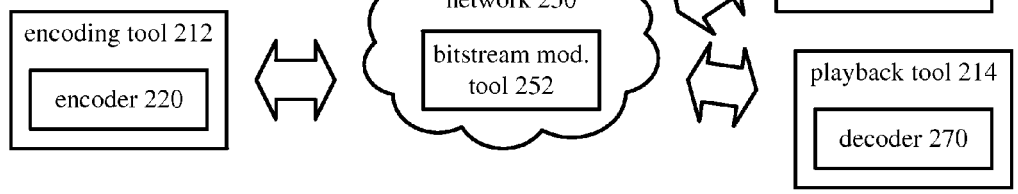

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265 standard, SMPTE 421M standard, H.264 standard, another standard, or a proprietary format, or a variation or extension thereof, with a corresponding decoder (270) accepting encoded data from the encoder (220). A given RTC tool (210), compared to another RTC tool (210), can use different implementations of encoder (220) and decoder (270), e.g., products from different companies, different versions from the same company. The bidirectional communication can be part of a videoconference, video telephone call, or other two-party or multi-party communication scenario. Although the network environment (201) in FIG. 2a includes two RTC tools (210), the network environment (201) can instead include three or more RTC tools (210) that participate in multi-party communication. For example, one RTC tool (210) may deliver encoded data to multiple other RTC tools (210), which may have different implementations of decoder (270), e.g., different loss recovery strategies.

Figure 3:
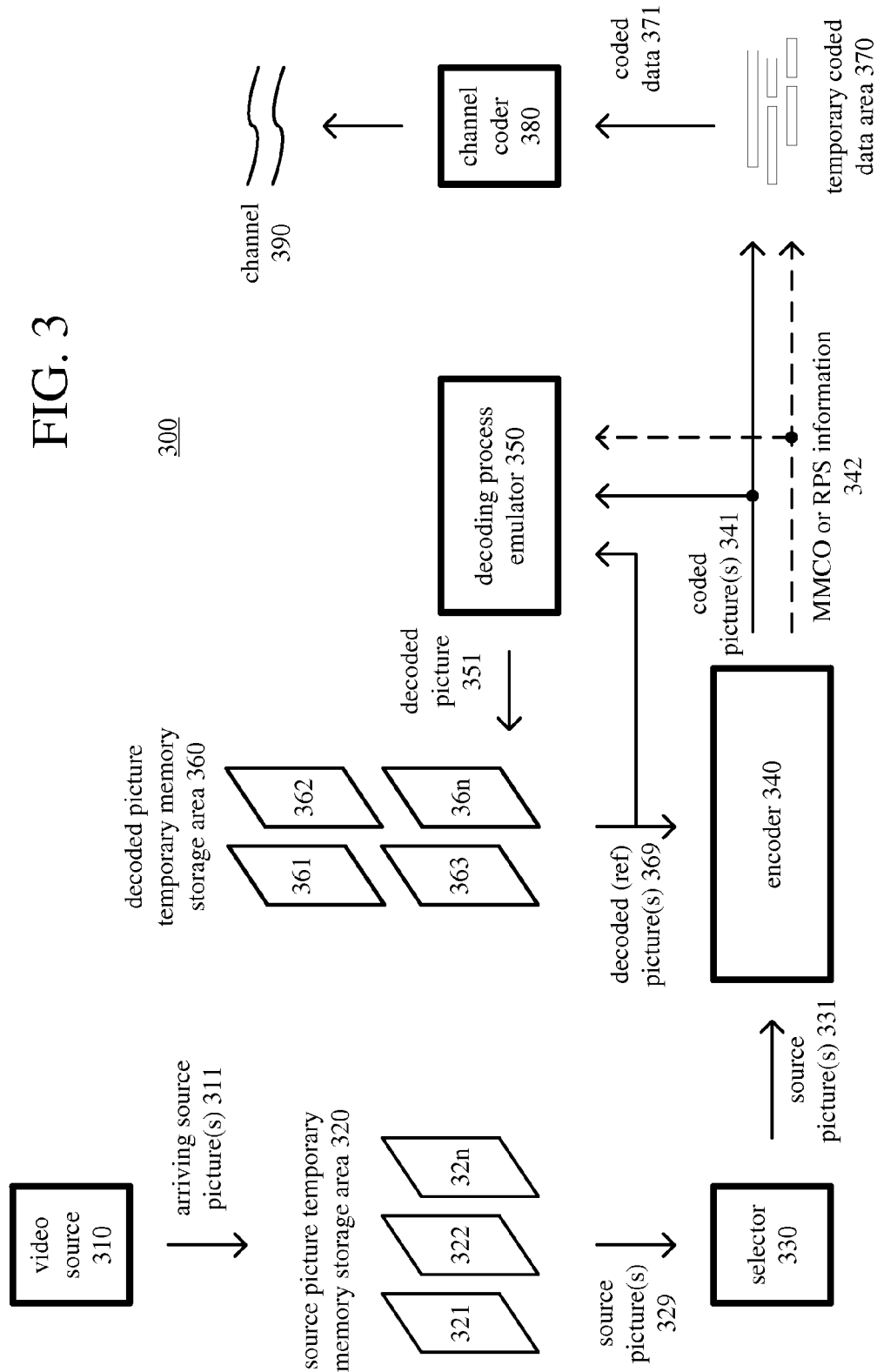
FIG. 3 is a diagram of an example encoder system.
Figure 4:
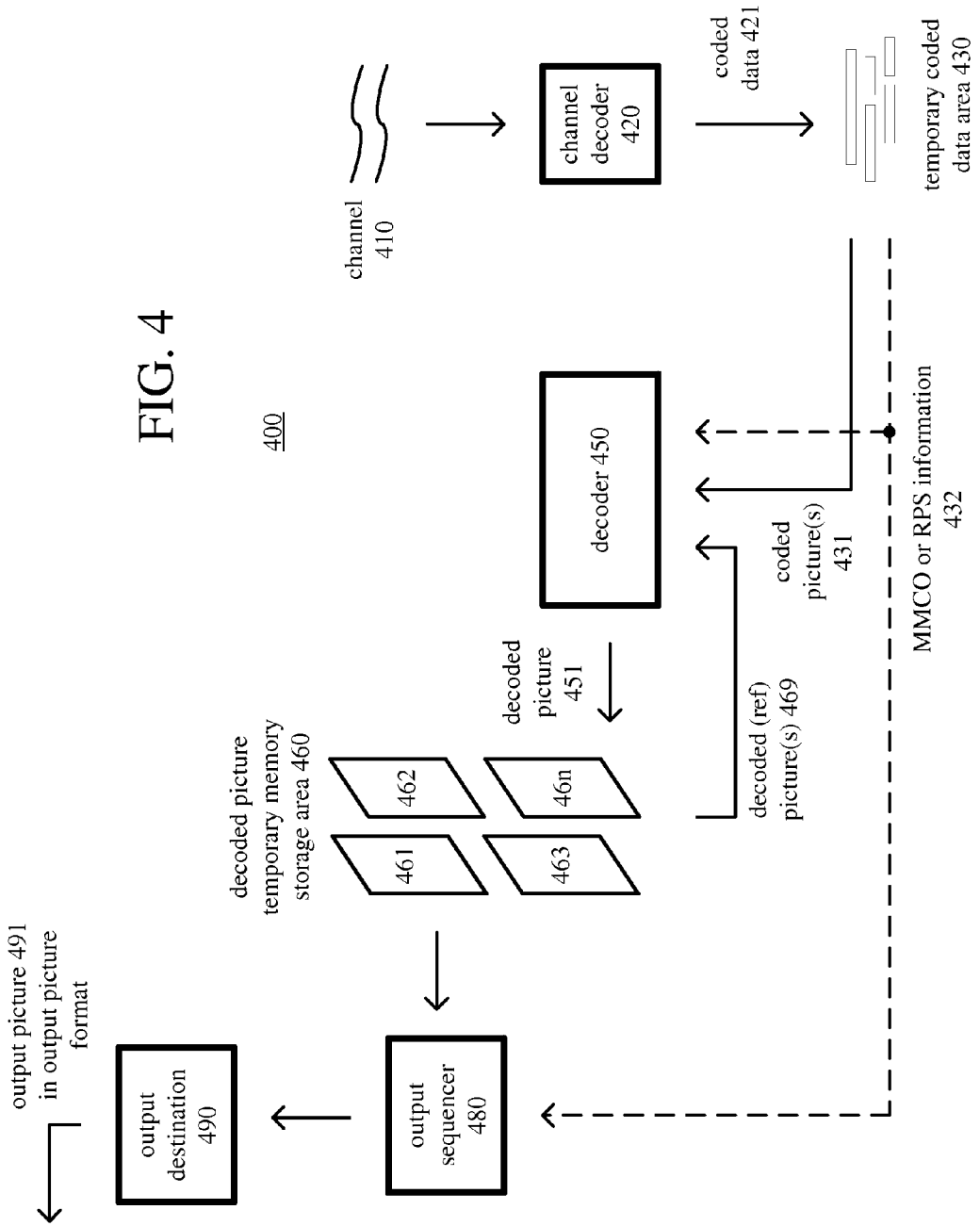
FIG. 4 is a diagram of an example decoder system.

An RTC tool (210) manages encoding by an encoder (220). FIG. 3 shows an example encoder system (300) that can be included in the RTC tool (210). Alternatively, the RTC tool (210) uses another encoder system. An RTC tool (210) also manages decoding by a decoder (270). FIG. 4 shows an example decoder system (400) that can be included in the RTC tool (210). Alternatively, the RTC tool (210) uses another decoder system.

In FIG. 2a, a bitstream modification tool (252) runs on a server ("inter-operability server") at a network node in the network (250). The bitstream modification tool (252) receives an incoming bitstream from one RTC tool (210), selectively modifies the bitstream to mitigate loss in inter-operability scenarios, and outputs an outgoing (selectively modified) bitstream to another RTC tool (210). The other RTC tool (210) may receive the modified bitstream or the original, unmodified bitstream, depending on inter-operability criteria. Examples of bitstream modification tool (252) are described below.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Different playback tools (214) can use different implementations of decoder (270), e.g., products from different companies, different versions from the same company. Although the network environment (202) in FIG. 2b includes two playback tools (214), the network environment (202) can include more or fewer playback tools (214). For example, one encoding tool (212) may deliver encoded data to three or more playback tools (214), which may have different implementations of decoder (270). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400) that can be included in a playback tool (214). Alternatively, the playback tool (214) uses another decoder system. A playback tool (214) can include client-side controller logic for managing connections with the encoding tool (212).

In FIG. 2b, a bitstream modification tool (252) runs on a server (inter-operability server) at a network node in the network (250). The bitstream modification tool (252) receives an incoming bitstream from the encoding tool (212), selectively modifies the bitstream to mitigate loss in inter-operability scenarios, and outputs an outgoing (selectively modified) bitstream to the respective playback tools (214). Different playback tools (214) may receive the modified bitstream or the original, unmodified bitstream, depending on inter-operability criteria. Examples of bitstream modification tool (252) are described below.

III. Example Encoder Systems and Decoder Systems.

To illustrate features of bitstream modification described herein, this section describes various aspects of encoding and decoding, including aspects of example reference picture management strategies, IDR picture marking strategies, and scalable coding/decoding.

A. Example Encoder Systems.

FIG. 3 is a block diagram of an example encoder system (300). The encoder system (300) can be a general-purpose encoding tool capable of operating in any of multiple encoding modes such as a low-latency encoding mode for real-time communication or remote desktop conferencing, a transcoding mode, and a higher-latency encoding mode for producing media for playback from a file or stream, or it can be a special-purpose encoding tool adapted for one such encoding mode. The encoder system (300) can be adapted for encoding of a particular type of content. The encoder system (300) can be implemented as part of an operating system module, as part of an application library, as part of a standalone application, or using special-purpose hardware. The encoder system (300) can use one or more general-purpose processors (e.g., one or more CPUs) for some or all encoding operations, use graphics hardware (e.g., a GPU) for certain encoding operations, or use special-purpose hardware such as an ASIC for certain encoding operations. Overall, the encoder system (300) receives a sequence of source video pictures (311) and encodes the source pictures (311) to produce encoded data as output to a channel (390).

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction.

Before the encoder (340), the encoder system (300) can include a pre-processor (not shown) that performs pre-processing (e.g., filtering) of the selected picture (331) before encoding. The pre-processing can include the color space conversion into primary (e.g., luma) and secondary (e.g., chroma differences toward red and toward blue) components and resampling processing (e.g., to reduce the spatial resolution of chroma components) for encoding.

The encoder (340) encodes the selected picture (331) to produce a coded picture (341) and also produces memory management control operation ("MMCO") or reference picture set ("RPS") information (342). If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence are to be stored in a picture storage area. Examples of uses of MMCO/RPS information (342) and reference picture management are described in section III.C.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be H.26x format (e.g., H.261, H.262, H.263, H.264, H.265), Windows Media Video format, VC-1 format, MPEG-x format (e.g., MPEG-1, MPEG-2, or MPEG-4), VPx format (e.g., VP8, VP9), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks for purposes of encoding and decoding.

For syntax according to the H.264 standard, the encoder (340) can partition a picture into multiple slices of the same size or different sizes. The encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265 standard, the encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder (340). A luma CTB can contain, for example, 64×64, 32×32 or 16×16 luma sample values. A CTU includes one or more coding units. A coding unit ("CU") has a luma coding block ("CB") and two corresponding chroma CBs. Generally, a CU has a prediction mode such as inter or intra. A CU includes one or more prediction units for purposes of signaling of prediction information (such as prediction mode details, etc.) and/or prediction processing. A prediction unit ("PU") has a luma prediction block ("PB") and two chroma PBs. A CU also has one or more transform units for purposes of residual coding/decoding, where a transform unit ("TU") has a luma transform block ("TB") and two chroma TBs. The encoder decides how to partition video into CTUs, CUs, PUs, TUs, etc.

As used herein, the term "block" can indicate a macroblock, residual data unit, CB, PB or TB, or some other set of sample values, depending on context. The term "unit" can indicate a macroblock, CTU, CU, PU, TU or some other set of blocks, or it can indicate a single block, depending on context, or it can indicate a slice, tile, picture, group of pictures, or other higher-level area.

Returning to FIG. 3, the encoder (340) compresses pictures using intra-picture coding and/or inter-picture coding. A general encoding control receives pictures as well as feedback from various modules of the encoder (340). Overall, the general encoding control provides control signals to other modules (such as a tiling module, transformer/scaler/quantizer, scaler/inverse transformer, intra-picture estimator, motion estimator and intra/inter switch) to set and change coding parameters during encoding. Thus, the general encoding control can manage decisions about encoding modes during encoding. The general encoding control produces general control data that indicates decisions made during encoding, so that a corresponding decoder can make consistent decisions.

The encoder (340) represents an intra-picture-coded block of a source picture (331) in terms of prediction from other, previously reconstructed sample values in the picture (331). The picture (331) can be entirely or partially coded using intra-picture coding. For intra spatial prediction for a block, the intra-picture estimator estimates extrapolation of the neighboring reconstructed sample values into the block (e.g., determines the direction of spatial prediction to use for the block). The intra-picture estimator can output prediction information (such as prediction mode/direction for intra spatial prediction), which is entropy coded. An intra-picture prediction predictor applies the prediction information to determine intra prediction values from neighboring, previously reconstructed sample values of the picture (331).

The encoder (340) represents an inter-picture-coded, predicted block of a source picture (331) in terms of prediction from one or more reference pictures. A decoded picture temporal memory storage area (360) (e.g., decoded picture buffer ("DPB")) buffers one or more reconstructed previously coded pictures for use as reference pictures. A motion estimator estimates the motion of the block with respect to one or more reference pictures (369). When multiple reference pictures are used, the multiple reference pictures can be from different temporal directions or the same temporal direction. The motion estimator outputs motion information such as MV information and reference picture selection data, which is entropy coded. A motion compensator applies MVs to reference pictures (369) to determine motion-compensated prediction values for inter-picture prediction.

The encoder (340) can determine the differences (if any) between a block's prediction values (intra or inter) and corresponding original values. These prediction residual values are further encoded using a frequency transform (if the frequency transform is not skipped) and quantization. In general, a frequency transformer converts blocks of prediction residual data (or sample value data if the prediction is null) into blocks of frequency transform coefficients. In general, a scaler/quantizer scales and quantizes the transform coefficients. For example, the quantizer applies deadzone scalar quantization to the frequency-domain data with a quantization step size that varies on a picture-by-picture basis, tile-by-tile basis, slice-by-slice basis, macroblock-by-macroblock basis, or other basis. Transform coefficients can also be scaled or otherwise quantized using other scale factors (e.g., weights in a weight matrix). Typically, the encoder (340) sets values for quantization parameter ("QP") for a picture, tile, slice, macroblock, CU and/or other portion of video, and quantizes transform coefficients accordingly.

An entropy coder of the encoder (340) compresses quantized transform coefficient values as well as certain side information (e.g., MV information, reference picture indices, QP values, mode decisions, parameter choices). Typical entropy coding techniques include Exponential-Golomb coding, Golomb-Rice coding, arithmetic coding, differential coding, Huffman coding, run length coding, and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

With reference to FIG. 3, the coded pictures (341) and MMCO/RPS information (342) (or information equivalent to the MMCO/RPS information (342), since the dependencies and ordering structures for pictures are already known at the encoder (340)) are processed by a decoding process emulator (350). In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

Thus, the decoding process emulator (350) implements some of the functionality of a decoder. For example, the decoding process emulator (350) performs inverse scaling and inverse quantization on quantized transform coefficients and, when the transform stage has not been skipped, performs an inverse frequency transform, producing blocks of reconstructed prediction residual values or sample values. The decoding process emulator (350) combines reconstructed residual values with values of a prediction (e.g., motion-compensated prediction values, intra-picture prediction values) to form a reconstruction. This produces an approximate or exact reconstruction of the original content from the video signal. (In lossy compression, some information is lost from the video signal.)

For intra-picture prediction, the values of the reconstruction can be fed back to the intra-picture estimator and intra-picture predictor. Also, the values of the reconstruction can be used for motion-compensated prediction of subsequent pictures. The values of the reconstruction can be further filtered. An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The encoder (340) produces encoded data in an elementary bitstream. The syntax of the elementary bitstream is typically defined in a codec standard or format. As the output of the encoder (340), the elementary bitstream is typically packetized or organized in a container format, as explained below. The encoded data in the elementary bitstream includes syntax elements organized as syntax structures. In general, a syntax element can be any element of data, and a syntax structure is zero or more syntax elements in the elementary bitstream in a specified order. For syntax according to the H.264 standard or H.265 standard, a network abstraction layer ("NAL") unit is the basic syntax structure for conveying various types of information. A NAL unit contains an indication of the type of data to follow (NAL unit type) and a payload of the data in the form of a sequence of bytes.

For syntax according to the H.264 standard or H.265 standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture. Within the encoded data for a picture, a syntax element indicates which PPS to use for the picture. Similarly, for syntax according to the H.264 standard or H.265 standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

The coded pictures (341) and MMCO/RPS information (342) are buffered in a temporary coded data area (370) or other coded data buffer. The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection over a network, or another channel for the output. The channel encoder (380) or channel (390) may also include other elements (not shown), e.g., for forward-error correction ("FEC") encoding and analog signal modulation.

B. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication or remote desktop conferencing, a transcoding mode, and higher-latency decoding mode for media playback from a file or stream, or it can be a special-purpose decoding tool adapted for one such decoding mode. The decoder system (400) can be adapted for decoding of a particular type of content. The decoder system (400) can be implemented as an operating system module, as part of an application library, as a standalone application, or using special-purpose hardware. The decoder system (400) can use one or more general-purpose processors (e.g., one or more CPUs) for some or all decoding operations, use graphics hardware (e.g., a GPU) for certain decoding operations, or use special-purpose hardware such as an ASIC for certain decoding operations. Overall, the decoder system (400) receives coded data from a channel (410), decodes pictures, and produces reconstructed pictures as output for an output destination (490).

The decoder system (400) includes a channel (410), which can represent storage, a communications connection over a network, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded pictures (431) and MMCO/RPS information (432). The coded data (421) in the coded data area (430) contains, as part of the syntax of an elementary coded video bitstream, coded data for one or more coded pictures. The format of the elementary bitstream can be a Windows Media Video format, VPx format (e.g., VP8, VP9), VC-1 format, MPEG-x format (e.g., MPEG-1, MPEG-2, or MPEG-4), H.26x format (e.g., H.261, H.262, H.263, H.264, H.265), or another format. The coded data (421) in the coded data area (430) can also include media metadata relating to the coded pictures (e.g., as one or more parameters in one or more SEI messages or VUI messages).

In general, the coded data area (430) temporarily stores coded data (421) until such coded data (421) is used by the decoder (450). At that point, coded data for a coded picture (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded picture (431) to produce a corresponding decoded picture (451). A picture can be partitioned into multiple tiles of the same size or different sizes. A picture can also be organized as one or more slices. The content of a slice or tile can be further partitioned into blocks or other sets of sample values. The decoder (450) is block-based and uses a block format that depends on implementation. Blocks may be further subdivided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TUs (TBs).

The decoder (450) decompresses pictures using intra-picture decoding and/or inter-picture decoding. Generally, the decoder (450) includes multiple decoding modules that perform decoding tasks such as entropy decoding, intra-picture prediction, motion-compensated inter-picture prediction, inverse quantization, inverse frequency transforms (if not skipped), and merging of tiles. The exact operations performed by the decoder (450) can vary depending on compression format.

In the decoder (450), a buffer receives encoded data in a coded video bitstream and makes the received encoded data available to a parser/entropy decoder. The parser/entropy decoder entropy decodes entropy-coded data, typically applying the inverse of entropy coding performed in the encoder (340) (e.g., context-adaptive binary arithmetic decoding). A general decoding control receives the general control data and provides control signals to other modules (such as the scaler/inverse transformer, intra-picture predictor, motion compensator and intra/inter switch) to set and change decoding parameters during decoding. Thus, the general decoding control can manage decisions about decoding modes during decoding.

As appropriate, when performing its decoding process, the decoder (450) may use one or more previously decoded pictures (469) as reference pictures for inter-picture prediction. The decoder (450) reads such previously decoded pictures (469) from a decoded picture temporary memory storage area (460). A motion compensator receives motion data, such as MV data and reference picture selection data. The motion compensator applies MVs to the reconstructed reference picture(s) to form motion-compensated prediction values for any inter-picture-coded blocks of the picture being reconstructed.

An intra-picture prediction module receives intra prediction data, such as data indicating prediction mode direction (for intra spatial prediction). For intra spatial prediction, using values of a reconstruction of the current picture, according to prediction mode data, the intra-picture prediction module spatially predicts sample values of a current block from neighboring, previously reconstructed sample values.

The decoder (450) also reconstructs prediction residual values. A scaler/inverse quantizer inverse scales and inverse quantizes entropy-decoded transform coefficients. For example, the decoder (450) sets values for QP for a picture, tile, slice and/or other portion of video based on syntax elements in the bitstream, and inverse quantizes transform coefficients accordingly. An inverse frequency transformer performs an inverse frequency transform, producing blocks of reconstructed prediction residual values or sample values, when the frequency transform has not been skipped.

For an inter-picture predicted block, the decoder (450) combines reconstructed prediction residual values with motion-compensated prediction values. When residual values have not been encoded/signaled, the decoder (450) uses the values of the prediction as the reconstruction. The decoder (450) can similarly combine prediction residual values with prediction values from intra-picture prediction. For intra-picture prediction, the values of the reconstruction can be fed back to the intra-picture predictor. For inter-picture prediction, the values of the reconstruction can be further filtered.

An adaptive deblocking filter is included within the motion compensation loop in the video decoder (450) to smooth discontinuities across block boundary rows and/or columns in the decoded picture (451). Other filtering (such as de-ringing filtering, ALF, or SAO filtering; not shown) can alternatively or additionally be applied as in-loop filtering operations. The decoder system (400) can also include a post-processing filter. The post-processing filter can include deblock filtering, de-ringing filtering, adaptive Wiener filtering, film-grain reproduction filtering, SAO filtering or another kind of filtering.

The decoded picture temporary memory storage area (460) includes multiple picture buffer storage areas (461, 462, . . . , 46*n*). The decoder (450) uses the MMCO/RPS information (432) to identify a picture buffer (461, 462, etc.) in which it can store a decoded picture (451). The decoder (450) stores the decoded picture (451) in that picture buffer.

An output sequencer (480) identifies when the next picture to be produced in output order is available in the decoded picture storage area (460). When the next picture (491) to be produced in output order is available in the decoded picture storage area (460), it is read by the output sequencer (480) and output to the output destination (490) (e.g., display) for display of the picture. In general, the order in which pictures are output from the decoded picture storage area (460) by the output sequencer (480) may differ from the order in which the pictures are decoded by the decoder (450).

C. Example Reference Picture Management.

A reference picture is, in general, a picture that contains samples that may be used for inter-picture prediction in the decoding process of other pictures, which typically follow the reference picture in decoding order. Multiple reference pictures may be available at a given time for use for motion-compensated prediction.

In general, a reference picture list ("RPL") is a list of reference pictures used for motion-compensated prediction. Reference pictures in the RPL are addressed with reference picture indices. A reference picture index identifies a reference picture in the RPL. During encoding and decoding, when an RPL is constructed, reference pictures in the RPL can change from time to time to add newly decoded pictures, drop older pictures that are no longer used as reference pictures and/or reorder reference pictures within the RPL to make signaling of the more commonly used reference picture indices more efficient. An encoder and decoder can follow the same rules to construct, modify, etc. their RPL(s). In addition to such rules (or instead of such rules), an encoder can signal information to a decoder that indicates how the decoder is to construct, modify, etc. its RPL(s) to match the RPL(s) used by the encoder. Typically, an RPL is constructed during encoding and decoding based upon available information about the RPL (e.g., available pictures in the RPS), modifications according to rules and/or modifications signaled in the bitstream.

In some example implementations, for a current picture, an encoder or decoder determines a RPS that includes reference pictures in a decoded frame storage area such as a DPB. The RPS is a description of the reference pictures used in the decoding process of the current and future coded pictures. Reference pictures included in the RPS are listed explicitly in the bitstream. The encoder or decoder determines the RPS once per picture. For example, the decoder determines the RPS after decoding a slice header for a slice of the picture, using syntax elements signaled in the slice header. Reference pictures are identified with picture order count ("POC") values, parts thereof and/or other information signaled in the bitstream. The encoder or decoder determines groups of short-term reference ("STR") pictures and long-term reference ("LTR") pictures that may be used in inter-picture prediction of the current picture (and that may be used in inter-picture prediction of one or more of the pictures following the current picture in decoding order). (The encoder or decoder may also determine groups of reference pictures that may be used in inter-picture prediction of one or more of the pictures following the current picture in decoding order, but are not used for the current picture.) Collectively, the groups of reference pictures are the RPS for the current picture.

In some example implementations, for a given slice of the current picture, the encoder or decoder creates one or more RPLs. The encoder or decoder creates a temporary version of an RPL (e.g., RPL 0 or RPL 1) by combining the groups of STR pictures and LTR pictures that may be used in inter-picture prediction of the current picture. To construct the RPL according to rules of an "implicit" approach, the encoder or decoder can use the reference pictures in the temporary version of the RPL, or use only some of the reference pictures in the temporary version of the RPL (e.g., the first x pictures in the temporary version of the RPL). For the "implicit" approach, RPL modification information is not signaled in the bitstream, and is not parsed from the bitstream. In an "explicit" approach, to construct the RPL, the encoder or decoder uses RPL modification information signaled in/parsed from the bitstream to select specific reference pictures from the temporary version of the RPL. Compared to the RPL that would be constructed by rules of the "implicit" approach, the RPL modification information can specify removal of one or more reference pictures, addition of one or more reference pictures and/or reordering of reference pictures in the RPL.

Alternatively, an encoder or decoder uses another approach to managing reference pictures.

D. Example Picture Marking for Decoder Restarts.

In some codec standards, an instantaneous decoding refresh ("IDR") picture is a specially marked picture in an elementary bitstream. In the H.264 standard, for example, an IDR picture is marked using a special value of NAL unit type. In the H.265 standard, an IDR picture is marked using any of several possible values of NAL unit type.

In general, an IDR picture causes a decoder to "reset" in various ways. For example, according to the H.264 standard, an IDR picture causes the decoder to mark all reference pictures as "unused for reference" immediately after the decoding of the IDR picture. Frame numbering (with the frame_num syntax element) restarts at the IDR picture. Typically, an IDR picture contains intra-picture coded content. Coded pictures that follow the IDR picture in decoding order can be decoded without inter-picture prediction from any picture that precedes the IDR picture in decoding order. The first picture of a sequence in decoding order is an IDR picture. IDR pictures may appear later in the sequence to provide "reset" points for decoding.

In some videoconferencing systems, a receiver node running a decoder can request an IDR picture when the receiver node detects corruption or is unable to continue decoding (e.g., due to loss of encoded data). In response, an encoder running on a transmitter node can insert an IDR picture in the bitstream, which facilitates recovery by the decoder. Until the decoder recovers (using the IDR picture), the decoder may drop pictures with missing reference pictures, instead displaying blank screens (e.g., black frames).

E. Example Scalable Layers.

When encoded video is delivered over the Internet to set-top boxes, mobile computing devices or personal computers, one video server can provide encoded video to multiple receiver devices. Or, in a videoconference, one RTC tool may deliver encoded video to multiple other RTC tools as receiver devices. Different receiver devices may have different screen sizes or computational capabilities, with some devices able to decode and play back high quality video, and other devices only able to play back lower quality video. Also, different receiver devices may use network connections having different bandwidths, with some devices able to receive higher bitrate (higher quality) encoded video, and other devices only able to receive lower bitrate (lower quality) encoded video.

Scalable video coding ("SVC") and decoding are a way to provide different versions of video at different levels of distortion, temporal quality and/or spatial resolution quality. With SVC, an encoder splits video into a base layer and one or more enhancement layers. The base layer alone provides a reconstruction of the video at a lower quality level (e.g., lower frame rate, lower spatial resolution and/or higher distortion). One or more enhancement layers can be reconstructed and added to reconstructed base layer video to increase video quality in terms of higher frame rate, higher spatial resolution and/or lower distortion. Scalability in terms of frame rate is an example of temporal scalability.

IV. Mitigating Loss in Inter-Operability Scenarios for Digital Video.

This section describes innovations in mitigating loss in inter-operability scenarios for digital video. For example, in a videoconferencing system with one or more network nodes and multiple end nodes (receiver nodes, transmitter nodes), a bitstream modification tool at a network node selectively performs a lightweight bitstream rewriting process on a bitstream it receives from a transmitter node. The bitstream modification tool selectively modifies the bitstream to make it more resilient to loss of encoded data when the bitstream is decoded. In this way, the bitstream rewriter can help avoid blank screens, frozen screens, or other failures during decoding under lossy delivery conditions at certain decoders. In some example implementations, the bitstream modification tool can change syntax element(s) to mitigate potential picture loss effects without changing the quality of video content and without significantly changing overall bitrate.

A. Example Inter-operability Problems.

Decoders may use different strategies to recover from the loss of encoded data (e.g., due to network congestion) during decoding. As a result of these differences in implementation, an encoder may encounter unexpected problems when inter-operating with decoders that use different loss recovery strategies. For example, during videoconferencing, video content encoded with an encoder may be delivered to any of several decoders that use different loss recovery strategies. When some of the encoded data is lost due to network congestion, one decoder may quickly recover from the loss of encoded data, while another decoder shows a blank screen or frozen screen for several seconds, or even fails to recover, requiring a time-consuming restart. In particular, for some decoders, picture loss effects (e.g., blank screens of black frames or green frames, frozen screens) occur frequently under even moderate lossy network conditions when decoding bitstreams produced by certain encoders. At the same time, for other decoders, decoding quickly recovers from comparable loss of encoded data.

For implementations of H.264 decoders, differences in loss recovery behavior can depend on several factors, including whether IDR pictures are used for loss recovery and whether a bitstream includes multiple temporal layers.

Some H.264 decoders rely heavily on IDR pictures to recover from loss of encoded data. An encoder adapted to operate with such IDR-reliant decoders periodically inserts an IDR picture in a sequence, and the encoder may even insert an IDR picture on demand when the encoder detects that encoded data has been lost. Other H.264 decoders rely heavily on LTR pictures to recover from loss of encoded data. An encoder adapted to operate with such LTR-reliant decoders uses LTR pictures and may maintain the LTR pictures over long periods of time. For LTR-reliant decoders, loss of an IDR picture may cause a fatal decoding error, triggering a time-consuming decoder restart. The fatal decoding error may be caused by detection of a large gap in frame numbering (frame_num) due to loss of the IDR picture. In any case, during the decoder restart, blank screens of black frames or green frames may be displayed. In contrast, IDR-reliant decoders typically recover much more quickly from the loss of an IDR picture.

As another example, some H.264 decoders nominally support decoding of bitstreams organized as multiple temporal layers, but do not gracefully handle picture loss for such bitstreams, especially when pictures of a temporal enhancement layer are not marked as reference pictures. Bitstreams organized as multiple temporal layers are correctly decoded under loss-free conditions. In many cases, however, loss of a picture from a bitstream organized as multiple temporal layers causes a decoding error, even triggering a time-consuming decoder restart, during which blank screens of black frames or green frames may be displayed. In contrast, for other H.264 decoders, loss of a picture from a bitstream organized as multiple temporal layers rarely causes a fatal decoding error.

B. Example Bitstream Modification Tools.

FIGS. 5a and 5b show example bitstream modification tools (501, 502) running on servers (inter-operability servers) at network nodes. In FIGS. 5a and 5b, a bitstream modification tool (501, 502) receives an incoming bitstream (505), which can be an elementary bitstream as described above. The bitstream modification tool (501, 502) produces an outgoing bitstream (525) with one or more syntax elements changed to mitigate picture loss effects during decoding under lossy delivery conditions. Typically, the incoming bitstream (505) and outgoing bitstream (525) are organized according to the same codec standard or format (e.g., both are H.264 bitstreams, or both are H.265 bitstreams).

In the bitstream modification tool (501) of FIG. 5a, a buffer (512) is configured to store the incoming bitstream (505). A bitstream rewriter (514) is configured to change one or more syntax elements of the incoming bitstream (505) without changing other syntax elements of the incoming bitstream (505). Examples of bitstream rewriting operations are described in the next sections. Alternatively, the bitstream rewriter (514) changes other and/or additional syntax elements. Another buffer (518) is configured to store the outgoing bitstream (525).

In the bitstream modification tool (502) of FIG. 5b, a buffer (512) is configured to store the incoming bitstream (505). A transcoder (515) is configured to fully decode the incoming bitstream (505) then re-encode results into the outgoing bitstream (525). Alternatively, the transcoder (515) is configured to partially decode the incoming bitstream (505) then re-encode results into the outgoing bitstream (525), passing through at least some syntax elements of the incoming bitstream (505) into the outgoing bitstream (525) without modification.

The bitstream modification tool (501) of FIG. 5a or bitstream modification tool (502) of FIG. 5b can change syntax element(s) to mitigate potential picture loss effects without changing the quality of video content between the incoming bitstream (505) and the outgoing bitstream (525) in terms of temporal resolution, spatial resolution, and signal-to-noise ratio ("SNR") resolution. For example, video content in the incoming bitstream (505) and video content in the outgoing bitstream (525) may have the same frame rate (example of temporal resolution), same coded picture dimensions (example of spatial resolution), and same level of distortion or quantization (example of SNR resolution), as indicated by QP values or other coding parameters or decisions. At the same time, overall bitrate can be unchanged, or substantially unchanged, between the incoming bitstream (505) and outgoing bitstream (525). Typically, to mitigate potential picture loss effects, the bitstream modification tool (501, 502) changes syntax element(s) in high-level, "control" syntax structures for a sequence, picture, or slice headers. As such, in most cases, the bitrate of the outgoing bitstream (525) is substantially the same as the bitrate of the incoming bitstream (505) (e.g., less than 0.01% difference in bitrate between the incoming bitstream (505) and outgoing bitstream (525), which may be slightly smaller or slightly larger than the incoming bitstream (505)). The "overhead" due to changes in syntax element(s) to mitigate potential picture loss effects has a relatively fixed, small magnitude. As overall bitrate increases (for higher quality video), the "overhead" is typically an ever smaller percentage of overall bitrate, so the percentage difference in overall bitrate between the incoming bitstream (505) and outgoing bitstream (525) decreases. For high-quality video content, differences in bitrate between the incoming bitstream (505) and outgoing bitstream (525) are negligible.

C. Example Bitstream Modification Techniques.

Figure 6:
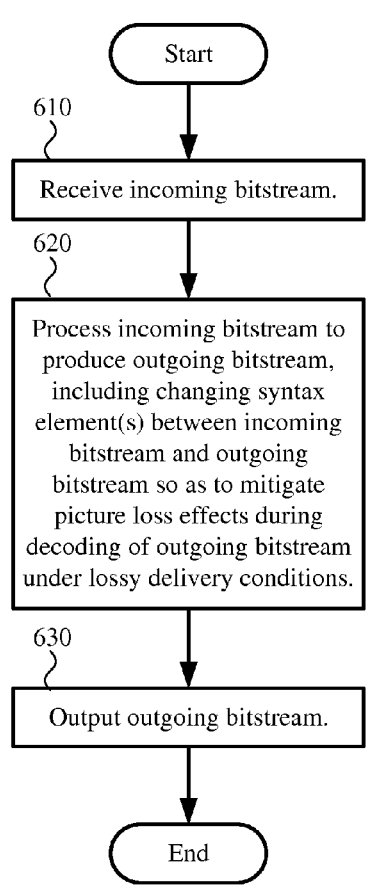
FIG. 6 is a flowchart of a generalized technique for bitstream modification to mitigate picture loss effects in inter-operability scenarios.

FIG. 6 shows a generalized technique (600) for bitstream modification to mitigate picture loss effects in inter-operability scenarios. A bitstream modification tool as described with reference to FIG. 5*a* or 5*b*, or other bitstream modification tool, can perform the technique (600).

To start, a bitstream modification tool (e.g., running at a node of a videoconferencing system) receives (610) an incoming bitstream of encoded video organized according to a given codec standard or format. The bitstream modification tool processes (620) the incoming bitstream to produce an outgoing bitstream of encoded video organized according to the given codec standard or format, then outputs (630) the outgoing bitstream. As part of the processing (620), the bitstream modification tool changes at least one syntax element between the incoming bitstream and the outgoing bitstream so as to mitigate picture loss effects during decoding of the outgoing bitstream under lossy delivery conditions. As part of the processing (620), the bitstream modification tool can switch between multiple modes for handling IDR pictures (as described in section IV.D) and/or convert a bitstream with multiple temporal layers into an outgoing bitstream with a single temporal layer (as described in section IV.E). Or, the bitstream modification tool can change the syntax element(s) in some other way.

To change the syntax element(s), the bitstream modification tool can use bitstream rewriting of the syntax element(s) between the incoming bitstream and the outgoing bitstream without modification of other syntax elements between the incoming bitstream and the outgoing bitstream. Various examples of lightweight bitstream rewriting are described below.

Or, to change the syntax element(s), the bitstream modification tool can use transcoding between the incoming bitstream and the outgoing bitstream by at least in part decoding the incoming bitstream and at least in part re-encoding results of the decoding. Transcoding provides a straightforward way to change syntax elements of a bitstream by controlling decisions made during re-encoding, but transcoding can be computationally expensive compared to bitstream rewriting. Due to its computational complexity, transcoding may not scale well when a bitstream modification tool concurrently processes bitstreams for multiple streams. Also, transcoding can introduce unacceptable delays for RTC scenarios.

Typically, the incoming bitstream is an elementary bitstream for the given codec standard or format, and the outgoing bitstream is an elementary bitstream for the same codec standard or format as the incoming bitstream. For example, the incoming bitstream and the outgoing bitstream are both H.264 bitstreams. Or, the incoming bitstream and the outgoing bitstream are both H.265 bitstreams. The changes to syntax element(s) can affect loss recovery behavior for certain decoders, without changing the end results of core decoding operations.

When the bitstream modification tool changes syntax element(s) to mitigate potential picture loss effects, the quality of video content may be unchanged between the incoming bitstream and outgoing bitstream in terms of temporal resolution, spatial resolution, and SNR resolution. For example, video content in the incoming bitstream may have the same frame rate, same coded picture dimensions, and same level of distortion or quantization (as indicated by QP values or other coding parameters or decisions) as the video content in the outgoing bitstream. At the same time, the bitrate of the outgoing bitstream can be very close to the bitrate of the incoming bitstream. Changing syntax element(s) in high-level, "control" syntax structures for a sequence, picture, or slice headers in order to mitigate potential picture loss effects usually does not significantly affect overall bitrate. As such, in most cases, the bitrate of the outgoing bitstream is substantially the same as the bitrate of the incoming bitstream (e.g., less than 0.01% difference in bitrate).

The bitstream modification tool can execute on a network node (e.g., for an inter-operability server) of a videoconferencing system. The videoconferencing system also includes multiple end nodes having RTC tools. In this context, the incoming bitstream is received from a transmitter node (e.g., a transmitter node that uses a loss recovery strategy that relies on IDR pictures and/or is robust to losses in a bitstream organized as multiple temporal layers), and the outgoing bitstream is transmitted to a receiver node (e.g., a receiver node that uses a loss recovery strategy that relies on LTR pictures and/or is not robust to losses in a bitstream organized as multiple temporal layers). Alternatively, the bitstream modification tool executes on another node of a videoconferencing system, or the bitstream modification tool executes in another environment.

The bitstream modification tool can selectively perform bitstream modification operations, depending on the decoder that will decode a bitstream. For example, the bitstream modification tool performs bitstream modification operations on a bitstream that is transmitted to a decoder that uses one loss recovery strategy, but the bitstream modification tool does not perform bitstream modification operations on a bitstream that is transmitted to a decoder that uses another loss recovery strategy.

D. Example Mode Switching During Bitstream Modification.

In some decoders, loss of an IDR picture may cause a fatal decoding error, triggering a time-consuming decoder restart. To mitigate picture loss effects due to lossy network conditions for such decoders, a bitstream modification tool can specially process IDR pictures in an incoming bitstream.

Figure 7:
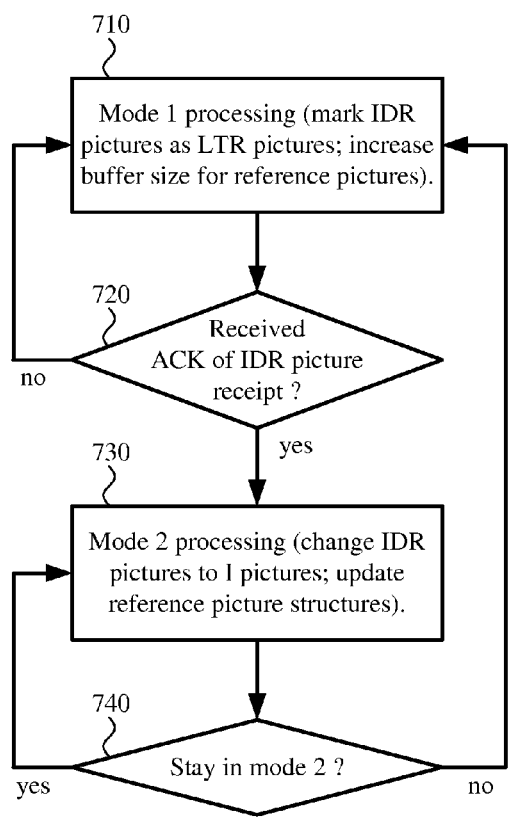
FIG. 7 is a flowchart of an example approach to switching between two modes for handling of instantaneous decoding refresh ("IDR") pictures during bitstream modification to mitigate picture loss effects in inter-operability scenarios.

FIG. 7 shows an example approach (700) to switching between two modes for handling of IDR pictures during bitstream modification to mitigate picture loss effects in inter-operability scenarios. According to the example approach (700), a bitstream modification tool switches between two modes.

FIGS. 8, 9*a*, 9*b*, 10*a*, 10*b*, 11, and 12 show syntax elements modified in some example implementations when switching between two modes for handling of IDR pictures (or when converting multiple temporal layers to a single temporal layer, as described in the next section). FIG. 8 shows a syntax structure (800) for a NAL unit according to the H.264 standard. The syntax structure (800) includes a nal_unit_type syntax element (802) that specifies the type of data in the NAL unit. When the value of the nal_unit_type syntax element (802) is 5, the NAL unit includes encoded data for a coded slice of an IDR picture.

FIGS. 9*a* and 9*b* show a syntax structure (900) for SPS data according to the H.264 standard. The syntax structure (900) includes various syntax elements specifying attributes of a sequence. In particular, the max_num_ref_frames syntax element (901) indicates the maximum number of reference frames that may be used for motion-compensated prediction during decoding. This can affect the number of buffers available for reference pictures, and it can also affect the process of updating the RPS and RPLs during decoding.

FIGS. 10a and 10b show a syntax structure (1000) for a slice header according to the H.264 standard. The slice header syntax structure (1000) can include a syntax structure (1100) with information about reference picture list modifications (as shown in FIG. 11) and a syntax structure (1200) with information about reference picture marking (as shown in FIG. 12). As shown in FIG. 12, the syntax structure (1200) with information about reference picture marking includes a long_term_reference_flag syntax element (1201) that indicates whether an IDR picture is marked as a STR picture (value of 0) or LTR picture (value of 1).

With reference to FIG. 7, the bitstream modification tool is initialized in a first mode of processing in which IDR pictures in the incoming bitstream are maintained in the outgoing bitstream. The bitstream modification tool initially performs processing (710) of an incoming bitstream in the first mode ("mode 1 processing"). The bitstream modification tool uses mode 1 processing (710) before a receiver node (running a decoder) acknowledges receipt of an IDR picture in the outgoing bitstream. The details of mode 1 processing (710) depend on implementation. For example, as part of mode 1 processing (710), for an IDR picture in the incoming bitstream that is not already marked as a LTR picture, the bitstream modification tool (a) marks the IDR picture as an LTR picture, and (b) increases buffer size for reference pictures (e.g., incrementing the value of a syntax element that indicates a maximum count of reference frames in a DPB).

In some example implementations, for mode 1 processing (710), the bitstream modification tool selectively adjusts the max_num_ref_frames syntax element (901) in the syntax structure (900) for SPS data (see FIG. 9) when processing an IDR picture. The bitstream modification tool selectively increments the value of max_num_ref_frames according to the following rule:

max_num_ref_frames+=(IDR already marked as LTR)?0: 1+(single layer)?0:1

That is, the bitstream modification tool increments the value of max_num_ref_frames if the IDR picture is not already marked as an LTR picture, potentially increasing the number of buffers in the DPB. The amount of the increment can be 1 or 2 buffers, depending on whether the bitstream is a single-layer bitstream or not. If the IDR picture is already marked as an LTR picture, the value of the max_num_ref_frames syntax element (901) is unchanged. (If the value of the max_num_ref_frames syntax element (901) cannot be increased because it has already reached a maximum value, the bitstream modification tool can continue mode 1 processing (710) indefinitely, skipping operations to mark IDR pictures as LTR pictures.)

For mode 1 processing (710) in some example implementations, the bitstream modification tool also forces the long_term_reference_flag syntax element (1201) to have a value of 1 when processing an IDR picture (see FIG. 12). That is, if the IDR picture is not already marked as an LTR picture, the bitstream modification tool changes the IDR picture from a STR to an LTR by changing the long_term_reference_flag syntax element (1201) to have a value of 1 in the syntax structure (1200) in the slice header for any slice of the IDR picture. (The rationale for marking the IDR picture as an LTR is explained below.)

Returning to FIG. 7, the bitstream modification tool checks (720) whether it has received an acknowledgement of receipt of an IDR picture from a receiver node (running a decoder). If not, the bitstream modification tool continues mode 1 processing (710). Otherwise, the bitstream modification tool switches to processing (730) of an incoming bitstream in a second mode ("mode 2 processing"). For example, the bitstream modification tool receives a feedback message from a receiver node (running a decoder) indicating receipt of an IDR picture and, in response to the feedback message, switches from mode 1 processing (710) to mode 2 processing (730).

In some example implementations, when a receiver node running a decoder receives an IDR picture, the receiver node sends a feedback message to an inter-operability server running on a network node of a videoconferencing system. The feedback message acknowledges that the receiver node has successfully received the IDR picture. The feedback message is only sent by the receiver node, however, if the IDR picture is marked as an LTR picture. Thus, to trigger the feedback message, for an IDR picture that is not already marked as an LTR picture, the bitstream modification tool marks the IDR picture as an LTR picture during mode 1 processing (710).

Returning to FIG. 7, the bitstream modification tool can consider other and/or additional conditions when deciding whether to switch from mode 1 processing (710) to mode 2 processing (730). The bitstream modification tool uses mode 2 processing (730) after switching from mode 1 processing (710). The details of mode 2 processing (730) depend on implementation. For example, as part of mode 2 processing (730), for an IDR picture in the incoming bitstream, the bitstream modification tool (a) converts the IDR picture to an intra (I) picture by changing NAL unit type, (b) removes at least one syntax element from each slice header of the I picture, and (c) modifies a syntax structure that includes information about reference picture handling.

In some example implementations, for mode 2 processing (730), the bitstream modification tool converts IDR pictures to I pictures by changing various syntax elements. The bitstream modification tool changes the nal_unit_type syntax element (802) in the NAL unit syntax structure (800) for the IDR picture from 5 to 1 (see FIG. 8). This effectively converts the IDR picture into an I picture, which mitigates loss when decoding under lossy network conditions for some decoders. Since the picture is no longer an IDR picture, the bitstream modification tool removes the idr_pic_id syntax element (1002) from any slice header syntax structure (1000) for the picture (see FIG. 10). The bitstream modification tool also modifies the reference picture marking syntax structure (1200) to include one or more syntax elements for the "non-IDR" path instead of syntax elements for the IDR path. For example, the bitstream modification tool removes the no_output_of_prior_pics_flag syntax element and the long_term_reference_flag syntax element (1201). Then, the bitstream modification tool sets a value of 1 for the adaptive_ref_pic_marking_mode_flag syntax element (1202), which is used to select the reference picture marking mode (0 for sliding window mode; 1 for adaptive window mode), and sets a value of 0 for the memory_management_control_operation syntax element. Or, after removing the IDR-path syntax elements, the bitstream modification tool can set a value of 0 for the adaptive_ref_pic_marking_mode_flag syntax element (1202). Or, after removing the IDR-path syntax elements, the bitstream modification tool adds other syntax elements in the non-IDR path, generally preserving MMCO patterns.

Returning to FIG. 7, the bitstream modification tool checks (740) whether to continue mode 2 processing (730)

or switch to mode 1 processing (710). The conditions for switching depend on implementation. For example, the bitstream modification tool detects a change in SPS data (e.g., different spatial resolution for encoding) in the incoming bitstream and, in response to the detection of the changed SPS data, switches from mode 2 processing (730) to mode 1 processing (710). Or, the bitstream modification tool detects a decoder restart and, in response to the detection of the decoder restart, switches from mode 2 processing (730) to mode 1 processing (710). (After a decoder restart, a decoder expects an IDR picture in order to begin decoding. In some example implementations, a decoder restart can be inferred when sequence number is reset to zero in feedback messages from a receiver node to a network node.) Alternatively, the bitstream modification tool infers that a decoder has restarted based on other criteria. The bitstream modification tool can consider other and/or additional conditions when deciding whether to switch from mode 2 processing (730) to mode 1 processing (710). When it does not switch back to mode 1 processing (710), the bitstream modification tool continues mode 2 processing (730).

E. Example Conversion to Single Temporal Layer.

Some decoders are especially vulnerable to corruption of a bitstream with multiple temporal layers, especially when a temporal enhancement layer of the bitstream includes non-reference pictures. Loss of a picture of such a bitstream may trigger a time-consuming decoder restart during which blank screens of black frames or green frames are displayed. To mitigate picture loss effects due to lossy network conditions for such decoders, a bitstream modification tool can convert multiple temporal layers of an incoming bitstream into a single temporal layer of an outgoing bitstream. When a bitstream modification tool switches between multiple modes for handling of IDR pictures, conversion operations to switch from multiple temporal layers to a single temporal layer can be performed in each of the multiple modes.

Figure 13:
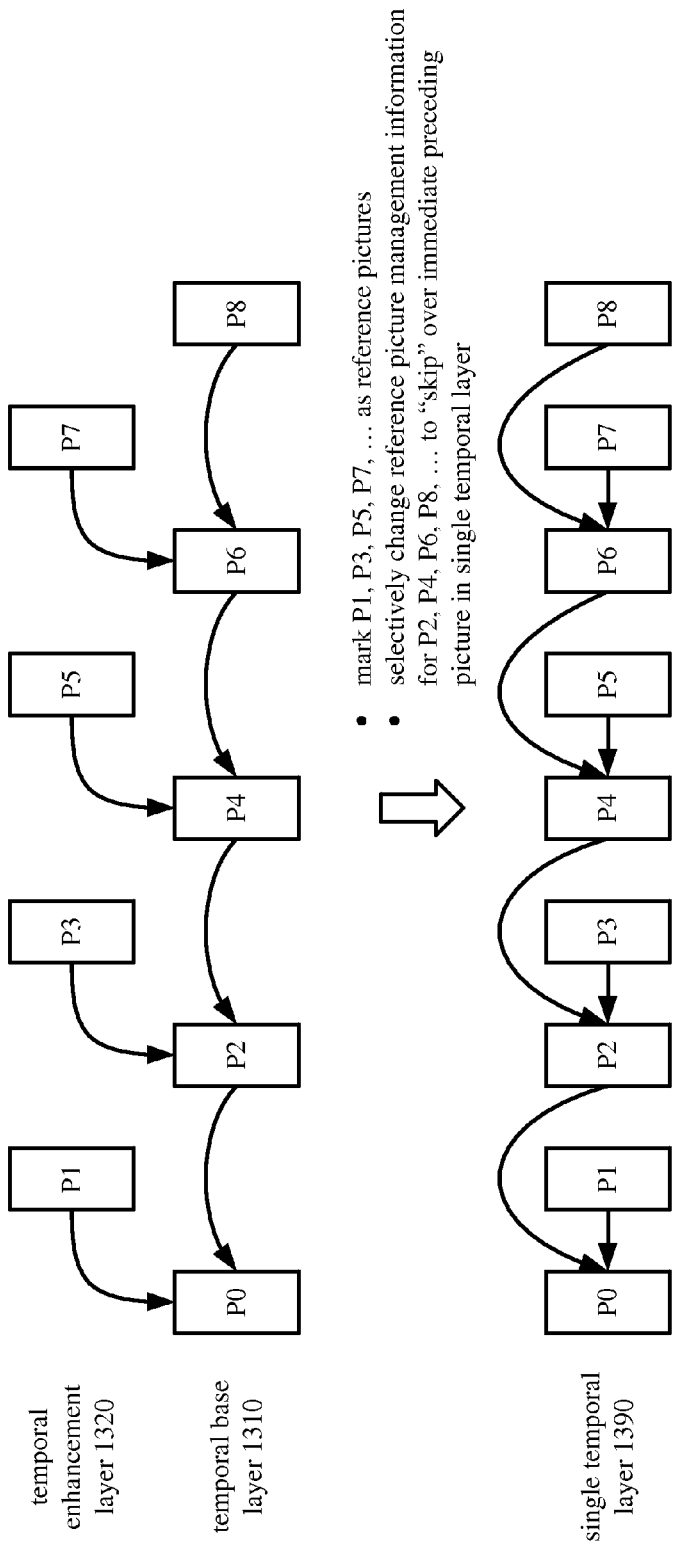
FIGS. 13 and 14 are diagrams of example approaches to conversion from multiple temporal layers to a single temporal layer during bitstream modification to mitigate picture loss effects in inter-operability scenarios.
Figure 14:
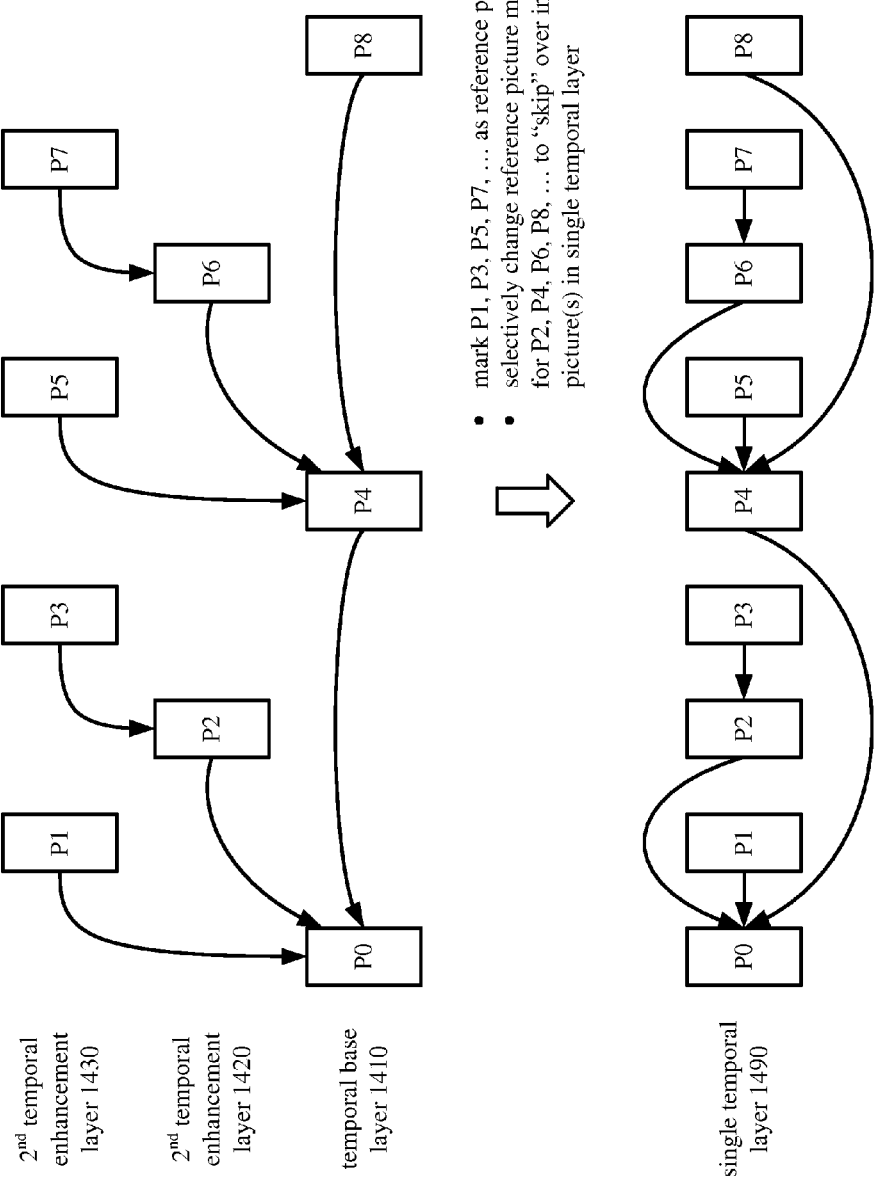

FIGS. 13 and 14 illustrate example approaches (1300, 1400) to converting multiple temporal layers to a single temporal layer during bitstream modification to mitigate picture loss effects in inter-operability scenarios. In particular, FIG. 13 shows an example approach (1300) to conversion from two temporal layers to a single temporal layer by a bitstream modification tool. The two temporal layers exhibit a regular pattern of reference picture dependencies. The temporal base layer (1310) includes even-numbered pictures P0, P2, P4, P6, P8, . . . . The first picture P0 is an IDR picture that includes intra-picture-coded content. Each later picture P2, P4, P6, P8, . . . in the temporal base layer (1310) of FIG. 13 includes at least some inter-picture-coded content, which is encoded with motion-compensated prediction using the immediately previous picture in the temporal base layer (1310) as a reference picture. The temporal enhancement layer (1320) includes odd-numbered pictures P1, P3, P5, P7, . . . . Each of the pictures in the temporal enhancement layer (1320) includes at least some inter-picture-coded content, which is encoded with motion-compensated prediction using the immediately previous picture in the temporal base layer (1310) as a reference picture. None of the pictures in the temporal enhancement layer (1320) is initially marked as a reference picture.

FIG. 14 shows an example approach (1400) to conversion from three temporal layers to a single temporal layer by a bitstream modification tool. The three temporal layers exhibit a regular pattern of reference picture dependencies. The temporal base layer (1410) includes every $4^{th}$ picture P0, P4, P8, . . . . The first picture P0 is an IDR picture that includes intra-picture-coded content. Each later picture P4, P8, . . . in the temporal base layer (1410) of FIG. 14 includes at least some inter-picture-coded content, which is encoded with motion-compensated prediction using the immediately previous picture in the temporal base layer (1410) as a reference picture. The first temporal enhancement layer (1420) includes the remaining even-numbered pictures P2, P6, . . . . Each of the pictures in the first temporal enhancement layer (1420) includes at least some inter-picture-coded content, which is encoded with motion-compensated prediction using the immediately previous picture in the temporal base layer (1410) as a reference picture. Each of the pictures in the first temporal enhancement layer (1420) is marked as a reference picture, since they may be used as reference pictures for pictures of the second temporal enhancement layer (1430). The second temporal enhancement layer (1430) includes odd-numbered pictures P1, P3, P5, P7, . . . . Each of the pictures in the second temporal enhancement layer (1430) includes at least some inter-picture-coded content, which is encoded with motion-compensated prediction using the immediately previous picture in the temporal base layer (1410) or first temporal enhancement layer (1420) as a reference picture. None of the pictures in the second temporal enhancement layer (1430) is initially marked as a reference picture.

When the bitstream modification tool converts the multiple temporal layers of the incoming bitstream into a single temporal layer for the outgoing bitstream, the bitstream modification tool processes pictures in the temporal enhancement layer(s) of the incoming bitstream. Specifically, for a picture in a temporal enhancement layer that is not already marked as a reference picture, the bitstream modification tool marks the picture as a reference picture and adds a syntax structure that includes information about reference picture handling. The reference pictures that will actually be used for decoding are unchanged, but additional pictures are marked as reference pictures. In the examples of FIGS. 13 and 14, the bitstream modification tool marks pictures P1, P3, P5, P7, . . . as reference pictures. In some example implementations, the bitstream modification tool selectively adjusts the nal_ref_idc syntax element (801) of the NAL unit syntax structure (800) (see FIG. 8). For a picture with nal_ref_idc equal to 0 in the incoming bitstream, the bitstream modification tool changes the value of the nal_ref_idc syntax element (801) to 1 and adds a syntax structure (1200) with information about reference picture marking. The syntax structure (1200) includes one or more syntax elements for the "non-IDR" path. For example, the bitstream modification tool adds an adaptive_ref_pic_marking_mode_flag syntax element (1202) with a value of 0. Alternatively, the reference picture marking syntax structure (1200) is modified in some other way.

When the bitstream modification tool converts the multiple temporal layers of the incoming bitstream into a single temporal layer for the outgoing bitstream, the bitstream modification tool also processes pictures in the temporal base layer of the incoming bitstream. Specifically, for a picture in the temporal base layer that has a reference picture used for motion compensation, the bitstream modification tool selectively adjusts reference picture management information to account for marking of new pictures (from the temporal enhancement layer(s)) as reference pictures. The reference pictures that will actually be used for decoding are unchanged (e.g., same reference picture indices used to identify reference pictures), but the reference picture management information may be changed to account for the introduction of new reference pictures from a temporal enhancement layer. In the examples of FIGS. 13 and 14, for a given picture, the reference picture is the immediately previous picture in a lower temporal enhancement layer or the temporal base layer. When new reference pictures are added in the single temporal layer, the "immediately previous picture" is no longer the correct reference picture for decoding, so the bitstream modification tool adjusts reference picture management information. In the example of FIG. 13, the bitstream modification tool selectively changes the reference picture management information for P2, P4, P6, P8, . . . to "skip" over the immediately previous picture in the single temporal layer (1390) (that is, to skip over the new reference picture added from the temporal enhancement layer (1320)). Similarly, in the example of FIG. 14, the bitstream modification tool selectively changes the reference picture management information for P2, P4, P6, P8, . . . to "skip" over the immediately previous picture(s) in the single temporal layer (1490), which were added from temporal enhancement layers.

In some example implementations, when selectively adjusting reference picture management information for a picture in the temporal base layer, the bitstream modification tool evaluates whether its reference picture is a LTR picture. If not, the bitstream modification tool adjusts the reference picture management information for the picture in the temporal base layer. For example, the bitstream modification tool evaluates the modification_of_pic_nums_idc syntax element (1101) (in the syntax structure (1100) shown in FIG. 11) for the picture of the temporal base layer. If the value of the modification_of_pic_nums_idc syntax element (1101) is 2, the picture in the temporal base layer already uses a previously marked LTR picture as a reference picture. As such, the reference picture management information is not adjusted (e.g., no RPL modification is performed). Otherwise, reference picture management information can be adjusted as follows. The bitstream modification tool sets the previous picture in the temporal base layer to be the initial reference picture in a DPB. The bitstream modification tool makes this change in the syntax structure (1100) that includes information about reference picture list modification for the picture in the temporal base layer. For example, for the first picture after an IDR picture in the temporal base layer (frame_num equal to 1 in the temporal base layer), the bitstream modification tool changes the value of the modification_of_pic_nums_idc syntax element (1101) to 2, and sets the value of the long_term_ref_pics syntax element (1103) to 0. In effect, this moves the IDR picture to the head of the DPB. For a later picture in the temporal base layer (frame_num greater than 1 in the temporal base layer), the bitstream modification tool changes the value of the modification_of_pic_nums_idc syntax element (1101) to 0, and sets a new value for the abs_diff_pic_num_minus1 syntax element (1102). For the example shown in FIG. 13, the value of the abs_diff_pic_num_minus1 syntax element (1102) is set to 1 for P2, P4, P6, P8, . . . . For the example shown in FIG. 14, the value of the abs_diff_pic_num_minus1 syntax element (1102) is set to 1 for P2, P6, . . . , and the value of the abs_diff_pic_num_minus1 syntax element (1102) is set to 3 for P4, P8, . . . . . In effect, this moves the previous picture in the temporal base layer to the head of the DPB.

More generally, for a given pattern of reference picture relationships among pictures of a temporal base layer and temporal enhancement layer(s), the bitstream modification tool selectively adjusts reference picture management information for pictures in the single temporal layer, so that appropriate reference pictures are used during decoding, even when new reference pictures have been added to the single temporal layer.

When converting multiple temporal layers into a single temporal layer, the bitstream modification tool can also adjust frame numbers for a non-IDR picture. For example, for all pictures in the single temporal layer except IDR pictures, the bitstream modification tool modifies the frame_num syntax element (1001), in effect resetting frame number to zero on each IDR picture and incrementing frame number from picture to picture between IDR pictures.

In some example implementations, pictures in different temporal layers are independently numbered. For example, pictures in a temporal base layer have their own series of frame numbers 0, 1, 2, . . . , and pictures in a temporal enhancement layer have their own series of frame numbers 0, 1, 2, . . . . After conversion to a single temporal layer, pictures in the single temporal layer have their own series of number. For example, in the pattern shown in FIG. 13, frame number n for a picture in the temporal base layer (1310) becomes frame number 2n in the single temporal layer (1390), and frame number n for a picture in the temporal enhancement layer (1320) becomes frame number 2n+1 in the single temporal layer (1390).

In FIGS. 13 and 14, the incoming bitstream includes two (FIG. 13) or three (FIG. 14) temporal layers. Alternatively, the incoming bitstream includes more temporal layers. Or, the incoming bitstream includes a single temporal layer, in which case the bitstream modification tool can skip the process of conversion to a single temporal layer.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing a node of a system configured for videoconferencing or other real-time communication, when programmed thereby, to perform bitstream modification operations comprising:
    receiving, at the node of the system, an incoming bitstream of encoded video organized according to a given codec standard or format, the incoming bitstream having multiple temporal layers;
    at the node of the system, processing the incoming bitstream to produce an outgoing bitstream of encoded video organized according to the given codec standard or format, the outgoing bitstream having a single temporal layer, wherein the processing includes converting the multiple temporal layers into the single temporal layer, and wherein the converting includes changing at least one syntax element between the incoming bitstream and the outgoing bitstream so as to mitigate picture loss effects during decoding of the outgoing bitstream under lossy delivery conditions; and
    outputting, from the node of the system, the outgoing bitstream.

2. The one or more computer-readable media of claim 1, wherein the node of the system is a network node, wherein the incoming bitstream is received from a transmitter node of the system, and wherein the outgoing bitstream is transmitted to a receiver node of the system.

3. The one or more computer-readable media of claim 1, wherein the changing the at least one syntax element uses bitstream rewriting of the at least one syntax element between the incoming bitstream and the outgoing bitstream without modification of other syntax elements between the incoming bitstream and the outgoing bitstream.

4. The one or more computer-readable media of claim 1, wherein the changing the at least one syntax element uses transcoding between the incoming bitstream and the outgoing bitstream by at least in part decoding the incoming bitstream and at least in part re-encoding results of the decoding.

5. The one or more computer-readable media of claim 1, wherein quality of video content is unchanged between the incoming bitstream and the outgoing bitstream in terms of temporal resolution, spatial resolution, and signal-to-noise ratio resolution.

6. The one or more computer-readable media of claim 1, wherein the changing comprises, for a picture in a temporal enhancement layer of the multiple temporal layers that is not already marked as a reference picture:
  marking the picture as a reference picture; and
  adding a syntax structure that includes information about reference picture handling.

7. The one or more computer-readable media of claim 1, wherein the changing comprises, for a picture in a temporal base layer of the multiple temporal layers that has a reference picture used for motion compensation, selectively adjusting reference picture management information to account for marking of new pictures, from at least one temporal enhancement layer of the multiple temporal layers, as reference pictures.

8. The one or more computer-readable media of claim 7, wherein the selectively adjusting the reference picture management information comprises, evaluating whether the reference picture for the picture in the temporal base layer is a long-term reference picture and, if not, adjusting the reference picture management information.

9. The one or more computer-readable media of claim 7, wherein the selectively adjusting the reference picture management information comprises, in a syntax structure that includes information about reference picture list modification for the picture in the temporal base layer, setting the previous picture in the temporal base layer to be an initial reference picture.

10. The one or more computer-readable media of claim 1, wherein the changing comprises adjusting frame number for any non-instantaneous decoding reference picture in the incoming bitstream.

11. A method comprising:
  receiving an incoming bitstream of encoded video organized according to a given codec standard or format;
  processing the incoming bitstream to produce an outgoing bitstream of encoded video organized according to the given codec standard or format, including changing at least one syntax element between the incoming bitstream and the outgoing bitstream so as to mitigate picture loss effects during decoding of the outgoing bitstream under lossy delivery conditions, without changing quality of video content between the incoming bitstream and the outgoing bitstream in terms of temporal resolution, spatial resolution, and signal-to-noise ratio resolution; and
  outputting the outgoing bitstream.

12. A node of a system configured for videoconferencing or other real-time communication, the node comprising:
  a buffer configured to receive an incoming bitstream of encoded video organized according to a given codec standard or format;
  a bitstream modification tool configured to process the incoming bitstream to produce an outgoing bitstream of encoded video organized according to the given codec standard or format, by changing at least one syntax element between the incoming bitstream and the outgoing bitstream so as to mitigate picture loss effects during decoding of the outgoing bitstream under lossy delivery conditions, wherein the changing the at least one syntax element uses bitstream rewriting of the at least one syntax element between the incoming bitstream and the outgoing bitstream without modification of other syntax elements between the incoming bitstream and the outgoing bitstream; and
  a buffer configured to store the outgoing bitstream.

13. The node of claim 12, wherein, to process the incoming bitstream to produce the outgoing bitstream, the bitstream modification tool is configured to switch between multiple modes, the multiple modes including:
  a first mode that is used before a receiver acknowledges receipt of an instantaneous decoding refresh ("IDR") picture in the outgoing bitstream; and
  a second mode that is used after the receiver has acknowledged receipt of an IDR picture in the outgoing bitstream.

14. The node of claim 12, wherein, to process the incoming bitstream to produce the outgoing bitstream, the bitstream modification tool is configured to convert multiple temporal layers of the incoming bitstream into a single temporal layer of the outgoing bitstream.

15. The method of claim 11, wherein the changing the at least one syntax element uses bitstream rewriting of the at least one syntax element between the incoming bitstream and the outgoing bitstream without modification of other syntax elements between the incoming bitstream and the outgoing bitstream.

16. The method of claim 11, wherein the changing the at least one syntax element uses transcoding between the incoming bitstream and the outgoing bitstream by at least in part decoding the incoming bitstream and at least in part re-encoding results of the decoding.

17. The method of claim 11, wherein the processing includes switching between multiple modes, the multiple modes including:
  a first mode that is used before a receiver node acknowledges receipt of an instantaneous decoding refresh ("IDR") picture in the outgoing bitstream; and
  a second mode that is used after the receiver node has acknowledged receipt of an IDR picture in the outgoing bitstream.

18. The method of claim 11, wherein the incoming bitstream has multiple temporal layers and the outgoing bitstream has a single temporal layer, and wherein the processing comprising converting the multiple temporal layers into the single temporal layer.

19. One or more computer-readable media storing computer-executable instructions for causing a node of a system configured for videoconferencing or other real-time communication, when programmed thereby, to perform bitstream modification operations comprising:
  receiving, at the node of the system, an incoming bitstream of encoded video organized according to a given codec standard or format;
  at the node of the system, processing the incoming bitstream to produce an outgoing bitstream of encoded video organized according to the given codec standard or format, wherein the processing includes switching between multiple modes, and wherein the switching includes changing at least one syntax element between the incoming bitstream and the outgoing bitstream so as to mitigate picture loss effects during decoding of the outgoing bitstream under lossy delivery conditions, the multiple modes including:
- a first mode that is used before a receiver node acknowledges receipt of an instantaneous decoding refresh ("IDR") picture in the outgoing bitstream; and
- a second mode that is used after the receiver node has acknowledged receipt of an IDR picture in the outgoing bitstream; and outputting, from the node of the system, the outgoing bitstream.

20. The one or more computer-readable media of claim 19, wherein the changing the at least one syntax element uses bitstream rewriting of the at least one syntax element between the incoming bitstream and the outgoing bitstream without modification of other syntax elements between the incoming bitstream and the outgoing bitstream.

21. The one or more computer-readable media of claim 19, wherein the changing the at least one syntax element uses transcoding between the incoming bitstream and the outgoing bitstream by at least in part decoding the incoming bitstream and at least in part re-encoding results of the decoding.

22. The one or more computer-readable media of claim 19, wherein quality of video content is unchanged between the incoming bitstream and the outgoing bitstream in terms of temporal resolution, spatial resolution, and signal-to-noise ratio resolution.

23. The one or more computer-readable media of claim 19, wherein, in the first mode, the changing includes, for an IDR picture in the incoming bitstream that is not already marked as a long-term reference ("LTR") picture:
- marking the IDR picture as a LTR picture; and
- incrementing a value of a syntax element that indicates a maximum count of reference frames in a decoded picture buffer.

24. The one or more computer-readable media of claim 19, wherein, in the second mode, the changing includes, for an IDR picture in the incoming bitstream:
- converting the IDR picture to an intra (I) picture by changing NAL unit type;
- removing at least one syntax element from each slice header of the I picture; and
- modifying a syntax structure that includes information about reference picture handling.

25. The one or more computer-readable media of claim 19, wherein the bitstream modification operations further comprise:
- receiving a feedback message from the receiver node; and
- in response to the feedback message, as part of the processing, switching from the first mode to the second mode.

26. The one or more computer-readable media of claim 19, wherein the bitstream modification operations further comprise:
- detecting a change sequence parameter set data in the incoming bitstream; and
- in response to the detection of the change in sequence parameter set data, as part of the processing, switching from the second mode to the first mode.

27. The one or more computer-readable media of claim 19, wherein the bitstream modification operations further comprise:
- detecting a decoder restart; and
- in response to the detection of the decoder restart, as part of the processing, switching from the second mode to the first mode.

28. A node of a system configured for videoconferencing or other real-time communication, the node comprising:
- a buffer configured to receive an incoming bitstream of encoded video organized according to a given codec standard or format;
- a bitstream modification tool configured to process the incoming bitstream to produce an outgoing bitstream of encoded video organized according to the given codec standard or format, by changing at least one syntax element between the incoming bitstream and the outgoing bitstream so as to mitigate picture loss effects during decoding of the outgoing bitstream under lossy delivery conditions, wherein the changing the at least one syntax element uses transcoding between the incoming bitstream and the outgoing bitstream by at least in part decoding the incoming bitstream and at least in part re-encoding results of the decoding; and
- a buffer configured to store the outgoing bitstream.

29. The node of claim 28, wherein, to process the incoming bitstream to produce the outgoing bitstream, the bitstream modification tool is configured to switch between multiple modes, the multiple modes including:
- a first mode that is used before a receiver acknowledges receipt of an instantaneous decoding refresh ("IDR") picture in the outgoing bitstream; and
- a second mode that is used after the receiver has acknowledged receipt of an IDR picture in the outgoing bitstream.

30. The node of claim 28, wherein, to process the incoming bitstream to produce the outgoing bitstream, the bitstream modification tool is configured to convert multiple temporal layers of the incoming bitstream into a single temporal layer of the outgoing bitstream.

* * * * *